(12) United States Patent
Kujawski, Jr. et al.

(10) Patent No.: US 9,739,367 B2
(45) Date of Patent: Aug. 22, 2017

(54) TRANSMISSION ANTI-LEAK VALVE

(71) Applicant: JIFFY-TITE COMPANY, INC., Lancaster, NY (US)

(72) Inventors: James A. Kujawski, Jr., Attica, NY (US); Kip R. Steveley, Rochester Hills, MI (US); James Caroll, Novi, MI (US); James Messecar, Sr., Wyoming, NY (US); Arthur J. Murray, Medina, NY (US); Joseph Anthony Giarrizzo, Amherst, NY (US); Robert Stoll, Soso, MS (US)

(73) Assignee: Oetiker NY, Inc., Lancaster, NY (US)

( * ) Notice: Subject to any disclaimer, the term of this patent is extended or adjusted under 35 U.S.C. 154(b) by 31 days.

(21) Appl. No.: 14/874,778

(22) Filed: Oct. 5, 2015

(65) Prior Publication Data

US 2016/0025210 A1    Jan. 28, 2016

Related U.S. Application Data

(63) Continuation-in-part of application No. 13/548,468, filed on Jul. 13, 2012, now abandoned.

(Continued)

(51) Int. Cl.
*F16H 61/00* (2006.01)
*F16L 37/40* (2006.01)
*F16L 29/02* (2006.01)

(52) U.S. Cl.
CPC .......... *F16H 61/0009* (2013.01); *F16L 37/40* (2013.01); *F16H 2061/0046* (2013.01);
(Continued)

(58) Field of Classification Search
CPC ............ F16H 61/0003; F16H 61/0009; F16H 2061/0046; F16L 29/02; F16L 37/38; F16L 37/40; F16L 37/413; F16L 37/42; F16L 29/04; F16L 37/32; F16L 37/34; Y10T 137/87925; Y10T 137/87933;
(Continued)

(56) References Cited

U.S. PATENT DOCUMENTS

RE8,337 E  *  7/1878  Gardner .................. F16L 37/00
                                                        137/614.04
1,343,819 A  *  6/1920  Grenci .................. F16L 37/113
                                                        184/105.3

(Continued)

*Primary Examiner* — Mary McManmon
*Assistant Examiner* — David Colon Morales
(74) *Attorney, Agent, or Firm* — Simpson & Simpson, PLLC

(57) ABSTRACT

A valve is mounted in a first bore in a first separable section of a transmission to block or allow fluid flow through the first bore to a second bore in a second transmission section depending on whether the first and second sections are joined together or separated. A movable portion of the valve is responsive to an actuator during relative movement of the transmission sections to shift between fluid flow open and fluid flow closed positions. The valve can include a valve housing fixed in the first bore and a carrying plunger biased to the fluid blocking position and responsive to the actuator for movement to the fluid flow open position. The valve forms a fluid flow path between the first and second bores across the gap between the facing surfaces of the joined transmission sections.

7 Claims, 19 Drawing Sheets

Related U.S. Application Data

(60) Provisional application No. 61/507,749, filed on Jul. 14, 2011.

(52) U.S. Cl.
CPC .......... *F16L 29/02* (2013.01); *Y10T 137/8593* (2015.04); *Y10T 137/87957* (2015.04)

(58) Field of Classification Search
CPC ..... Y10T 137/87941; Y10T 137/87949; Y10T 137/87957; Y10T 137/87965; Y10T 137/87973; Y10T 137/87981; Y10T 137/87885
USPC ... 251/142, 149, 149.1, 149.6, 149.7, 149.8, 251/149.9, 145, 147, 148
See application file for complete search history.

(56) References Cited

U.S. PATENT DOCUMENTS

| | | | | |
|---|---|---|---|---|
| 2,024,682 A * | 12/1935 | Eisenman | F16L 37/107 | 251/149.6 |
| 2,166,402 A * | 7/1939 | Gora | F16L 37/127 | 251/149.6 |
| 2,177,278 A * | 10/1939 | Hill | F16L 29/02 | 251/149.6 |
| 2,222,746 A * | 11/1940 | Kamenarovic | B60T 17/043 | 137/614.05 |
| 2,263,293 A * | 11/1941 | Ewald | F16L 37/0841 | 251/149.6 |
| 2,425,500 A | 8/1947 | Wiggins | | |
| 2,504,569 A | 4/1950 | Murphy et al. | | |
| 2,518,299 A | 8/1950 | Fernandez | | |
| 2,628,850 A * | 2/1953 | Summerville | F16L 37/096 | 137/595 |
| 2,820,651 A * | 1/1958 | Phillips | F16L 27/087 | 128/204.18 |
| 3,283,780 A | 11/1966 | Sutton | | |
| 3,339,883 A | 9/1967 | Drake | | |
| 3,567,175 A | 3/1971 | Sciuto, Jr. | | |
| 3,618,690 A * | 11/1971 | Johnson | F16K 17/042 | 137/514.7 |
| 3,704,002 A * | 11/1972 | Skarzynski | F16L 37/23 | 137/614.06 |
| 3,715,099 A | 2/1973 | Shendure | | |
| 3,741,521 A | 6/1973 | Tatsuno | | |
| 3,777,771 A * | 12/1973 | De Visscher | F16L 29/04 | 137/1 |
| 3,807,687 A | 4/1974 | Thompson | | |
| 3,821,922 A | 7/1974 | Kouns | | |
| 3,825,222 A * | 7/1974 | Petrova | F16L 29/02 | 137/516.29 |
| 4,150,809 A * | 4/1979 | Muller | F01M 11/0408 | 137/351 |
| 4,200,121 A | 4/1980 | Walter et al. | | |
| 4,378,028 A * | 3/1983 | Weber | F16L 37/23 | 137/614.04 |
| 4,408,521 A * | 10/1983 | Schelli | B21D 37/14 | 100/229 R |
| 4,436,125 A | 3/1984 | Blenkush | | |
| 4,541,457 A * | 9/1985 | Blenkush | F16L 37/0841 | 137/614.05 |
| 4,858,648 A * | 8/1989 | Smith, III | F16L 37/32 | 137/614 |
| 4,962,881 A * | 10/1990 | Otsuki | F16L 37/58 | 251/149.7 |
| 4,989,831 A * | 2/1991 | Ootsuki | F16L 37/42 | 137/115.13 |
| 5,113,657 A * | 5/1992 | Compton | F15B 7/005 | 192/85.01 |
| 5,238,221 A | 8/1993 | Schwaderer et al. | | |
| 5,261,638 A * | 11/1993 | Onishi | F16L 37/42 | 137/614.04 |
| 5,360,035 A * | 11/1994 | Smith | E21B 33/038 | 137/614 |
| 5,365,972 A * | 11/1994 | Smith, III | F16L 1/26 | 137/614.04 |
| 5,423,515 A | 6/1995 | Ozaki | | |
| RE34,987 E * | 7/1995 | Compton | B60T 17/043 | 192/85.01 |
| 5,560,548 A * | 10/1996 | Mueller | B05B 1/1663 | 239/442 |
| 5,577,706 A * | 11/1996 | King | F16L 37/42 | 251/149.1 |
| 5,716,081 A * | 2/1998 | Leigh-Monstevens | F16L 37/088 | 137/614.03 |
| 5,802,931 A | 9/1998 | Louis | | |
| 5,809,781 A | 9/1998 | Krantz | | |
| 5,911,404 A * | 6/1999 | Cheng | F16L 29/02 | 137/329.2 |
| 6,076,556 A * | 6/2000 | Fuchs | F15B 13/081 | 137/884 |
| 6,145,322 A | 11/2000 | Odashima | | |
| 6,176,263 B1 | 1/2001 | Lacroix et al. | | |
| 6,212,888 B1 * | 4/2001 | Nix | B60T 11/30 | 60/584 |
| 6,397,594 B2 | 6/2002 | Hauser et al. | | |
| 6,474,359 B1 * | 11/2002 | Smith, III | F16L 37/30 | 137/493.9 |
| 6,543,745 B1 * | 4/2003 | Enerson | F16L 29/02 | 251/149.7 |
| 6,776,421 B2 | 8/2004 | Florence et al. | | |
| 6,782,699 B2 | 8/2004 | Thoma et al. | | |
| 6,889,731 B2 * | 5/2005 | Vallon | B25C 1/08 | 137/614.17 |
| 6,899,315 B2 * | 5/2005 | Maiville | F16L 37/42 | 251/149.4 |
| 7,117,891 B2 | 10/2006 | Magnus et al. | | |
| 7,153,296 B2 * | 12/2006 | Mitchell | A61M 39/10 | 251/149.9 |
| 7,191,798 B2 | 3/2007 | Edelman et al. | | |
| 7,195,228 B2 * | 3/2007 | Tiberghien | F16L 37/42 | 251/149.6 |
| 7,299,823 B2 * | 11/2007 | Smith | A47C 27/082 | 137/597 |
| 7,856,820 B2 | 12/2010 | Ishii et al. | | |
| 8,776,637 B2 * | 7/2014 | Juhassz | F16D 25/12 | 137/614.05 |
| 2002/0088223 A1 | 7/2002 | Abend et al. | | |
| 2002/0095933 A1 | 7/2002 | Takada et al. | | |
| 2003/0025096 A1 * | 2/2003 | Jeory | F16L 29/02 | 251/149 |
| 2004/0189007 A1 * | 9/2004 | Olich | F16L 37/084 | 285/353 |
| 2008/0041048 A1 | 2/2008 | Kanenobu et al. | | |
| 2012/0013117 A1 * | 1/2012 | Bernshtein | F16L 37/004 | 285/9.1 |
| 2012/0037247 A1 * | 2/2012 | Konishi | F16L 37/23 | 137/515.5 |
| 2013/0175135 A1 * | 7/2013 | Juhassz | F16D 25/12 | 192/85.01 |

\* cited by examiner

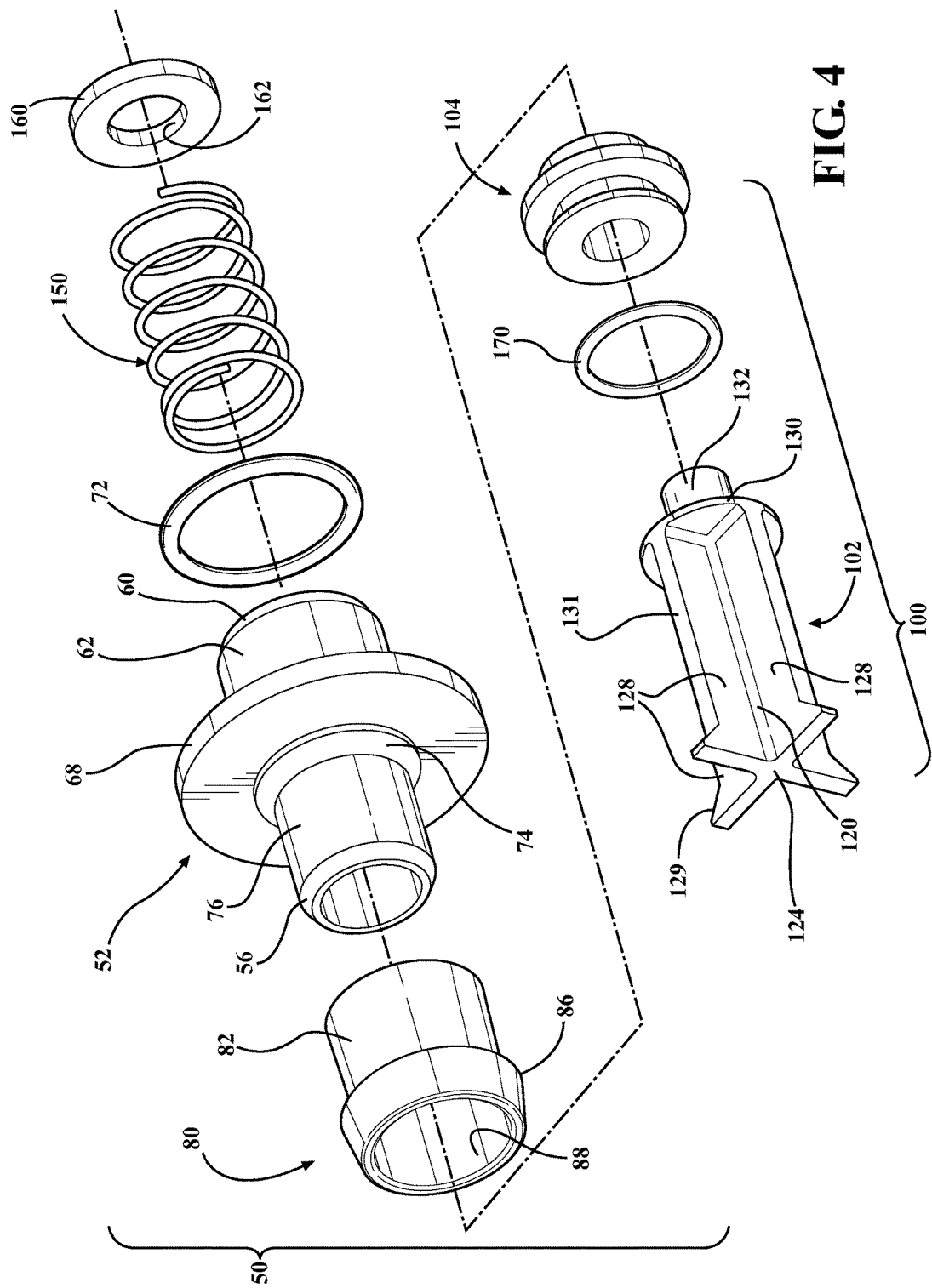

TRANSMISSION ANTI-LEAK VALVE

CROSS REFERENCE TO CO-PENDING APPLICATIONS

The present application is a continuation-in-part of co-pending U.S. patent application Ser. No. 13/548,468 for a TRANSMISSION ANTI-LEAK VALVE filed Jul. 13, 2012 which claims priority benefit to the Jul. 14, 2011 filing date of provisional patent application Ser. No. 61/507,749 for a TRANSMISSION ANTI-LEAK VALVE filed in the names of James A. Kujawski, Jr., Kip R. Steveley, James Caroll, James Messecar, Sr., Arthur J. Murray, Joseph Anthony Giarrizzo and Robert Stoll, the entire contents of both which are incorporated herein by reference.

BACKGROUND

The present transmission anti-leak valve relates, in general, to vehicle transmissions and specifically to vehicle transmissions having two or more separable sections and, even more specifically to anti-leak valves for vehicle transmissions having two or more separable sections One type of vehicle transmission design has two or more separate sections. The sections are joined together to establish flow paths for proper operation of the transmission. A fluid transition member is mounted in one of the bores in the two transmission sections and sealingly engages the corresponding bore in the other transmission section to establish a flow path between the bores in the two transmission sections when the two transmission sections are joined together. The transition member is typically formed of a seal material to establish a fluid seal connection in the bores in the two transmission sections; while at the same time establishing a fluid flow path between the two bores through the hollow interior of the transition member.

Occasionally, the transmission sections need to be separated for service at the manufacturing site or at a repair facility. Opening the transmission after it has been filled with transmission fluid causes the transmission fluid to leak from the separated transmission sections. Not only is the leak messy, the transmission fluid is toxic and it will contaminate the nearby floor and service bay and pose a safety hazard to service personnel.

SUMMARY

A transmission has at least first and second separable transmission sections, with a first fluid flow path including a first bore in the first separable section disposed in fluid flow communication with a second bore in the second separable section. A valve mounted in the first bore to block fluid flow from the first bore when the first and second separable sections are separated. The valve includes a movable plunger movable in response to engagement with an actuator, from the first fluid flow blocking position to a second position opening fluid flow through the first bore. The actuator is responsive to the joining and separation of the first and second transmission sections.

The valve includes a housing fixedly mountable in the first bore in the first transmission section. In one aspect, a plunger is movably mounted within the valve housing and has first and second opposed ends. The first end of the plunger is disposed exteriorly of the valve housing for movable contact or disengagement with an actuator in the second transmission section as the first and second transmission sections are joined or separated.

A first seal member is carried on the valve housing for sealing the housing in the bore. A second seal member is carried on the plunger, for sealing the plunger to an interior surface of the valve housing when plunger is in the first fluid flow blocking position.

A biasing means, carried in the valve housing, biases a plunger to the first position.

The plunger includes a stem carrying a plurality of radially outwardly extending ribs, the ribs defining axial flow paths along the stem. A cap is fixedly engageable with the stem. The cap includes an exterior surface engageable with an inner surface of the valve housing when the plunger is in the first position defining the first fluid flow blocking position of the valve.

In one aspect, the stem, rib and the cap are integrally formed as a unitary one-piece member mountable as a unit within the valve housing.

An exterior seal member is mountable over an end portion of the valve housing extending exteriorly of the bore in the first transmission section; the exterior seal member is engageable with an inner surface of the second bore in the second transmission section when the first and second transmission sections are joined together in a fixed relationship.

In another aspect, a biasing means is carried on the valve and engageable with a portion of the first separable transmission section for normally biasing the valve to the first position.

The actuator is responsive to separation and engagement of the first and second separate sections of the transmission for moving the plunger of the valve between the first and second positions.

In another aspect, the valve includes a body having opposed first and second ends, an internal bore formed in the body extending from the first end to a closed second end intermediate the first and second ends of the body, and at least one aperture in the body disposed in fluid flow of communication with the internal bore in the body to allow fluid flow through the internal bore in the body and the first bore in the first transmission section when the valve is in the second position. The at least one aperture can include a plurality of radially extending, circumferentially spaced apertures.

The valve further can include an angularly movable leg carried adjacent the second end of the body for engaging a portion of the interior surface of the first bore in the first transmission section to position the valve in the first position when the first and second transmission sections are separated. The angularly movable leg can be carried on a cap separably joinable to the body.

Means are provided, responsive to separation and engagement of the first and second separate sections of the transmission, for moving the valve between the first and second positions. The moving means comprises a protrusion extending from the second separable section through the opening in the bore in the first section when the first and second sections are joined together to engage and move the valve from the first position to the second position. The protrusion can be mounted in a bore in the second section.

An inner diameter of the bore in the first transmission section and an outer diameter of one end portion of the valve housing are configured for an interference fixed mounting of the one end of the valve housing in the first bore in the first transmission section.

A retainer is carried in the valve housing and defines a seat for the biasing means. An aperture is formed in the retainer to define a portion of a fluid flow path through the one end portion of the valve housing; a crimp on an end portion of the one end portion of the housing fixes the retainer in the one end of the housing.

The interface is provided to span and couple the first bore in the first transmission section in fluid flow communication with the second bore in the second transmission section when the first and second transmission sections are joined together. In one aspect, the interface includes the valve sealingly coupled to the first bore and the second bore when the first and second transmissions sections are joined together.

In another aspect, the interface includes a tubular member sealingly coupled in the second bore of the second transmission section. The valve in the first bore of the first transmission section sealingly engages and couples to an end of the tubular member when the first and second transmission sections are joined together.

In one aspect, the valve defines a fluid flow path between the first bore and the first transmission section and the second bore and the second transmission section when the first and second transmission sections are joined together.

The plunger includes a shaft, a plurality of spaced fingers extending from the shaft to the first end of the plunger, a plug carried at the second end of the shaft, and a seal member carried on the plug and engageable with the housing to close the bore in the valve housing to fluid flow when the first and second transmission sections are separated and the plunger is in the first position.

The shaft, the plurality of fingers and the plug can define a unitary, one piece plunger.

The seal member on the plug can be an O-ring. The O-ring retains the plunger in the valve housing when engaged with the valve housing in the first position of the plunger.

In one aspect a first seal is mounted on an exterior surface of the valve housing, the first seal sealing the valve housing in the first bore to the first transmission section. A second seal is also exteriorly mounted on the valve housing. The second seal seals the valve housing in the second bore to the second transmission section when the first and second transmission sections are engaged.

In another aspect a transmission includes at least first and second separable transmission sections defining an interface when the first and second vehicle transmission sections are joined together. A first fluid flow passageway extends through the first and second vehicle transmission sections. The first fluid flow passageway includes a first bore in a facing surface of the first vehicle transmission section disposed in the fluid flow in communication with a second bore in a facing surface of the second transmission section across the interface when the first and second vehicle transmission sections are joined together.

A valve includes a housing fixedly mounted in the first bore in the first transmission section. The valve blocks fluid flow from the first bore when the first and second transmission sections are separated. The valve includes a plunger movably mounted within the valve housing. The plunger has first and second opposed ends, the first end of the plunger disposed exteriorly of the valve housing. A spring carried in the valve housing, biases the plunger to a first position. An actuator is carried in the second bore. The actuator engages the first end of the plunger, and displaces the plunger relative to the valve housing from the first position to a second position as the first and second transmission sections are urged into engagement.

In this aspect, the plunger includes a shaft, a plurality of spaced fingers extending from the shaft to the first end of the plunger, a plug carried at the second end of the shaft; and a seal member carried on the plug and engageable with the housing to close the bore in the valve housing to fluid flow when the first and second transmission sections are separated and the plunger is in the first position.

BRIEF DESCRIPTION OF THE DRAWING

The various features, advantages and other uses of the present transmission anti-leak valve will become more apparent by referring to the following description and drawings in which:

FIG. 4 is an exploded perspective view showing the components of the valve shown in FIGS. 2 and 3;

DETAILED DESCRIPTION

Figure 1:
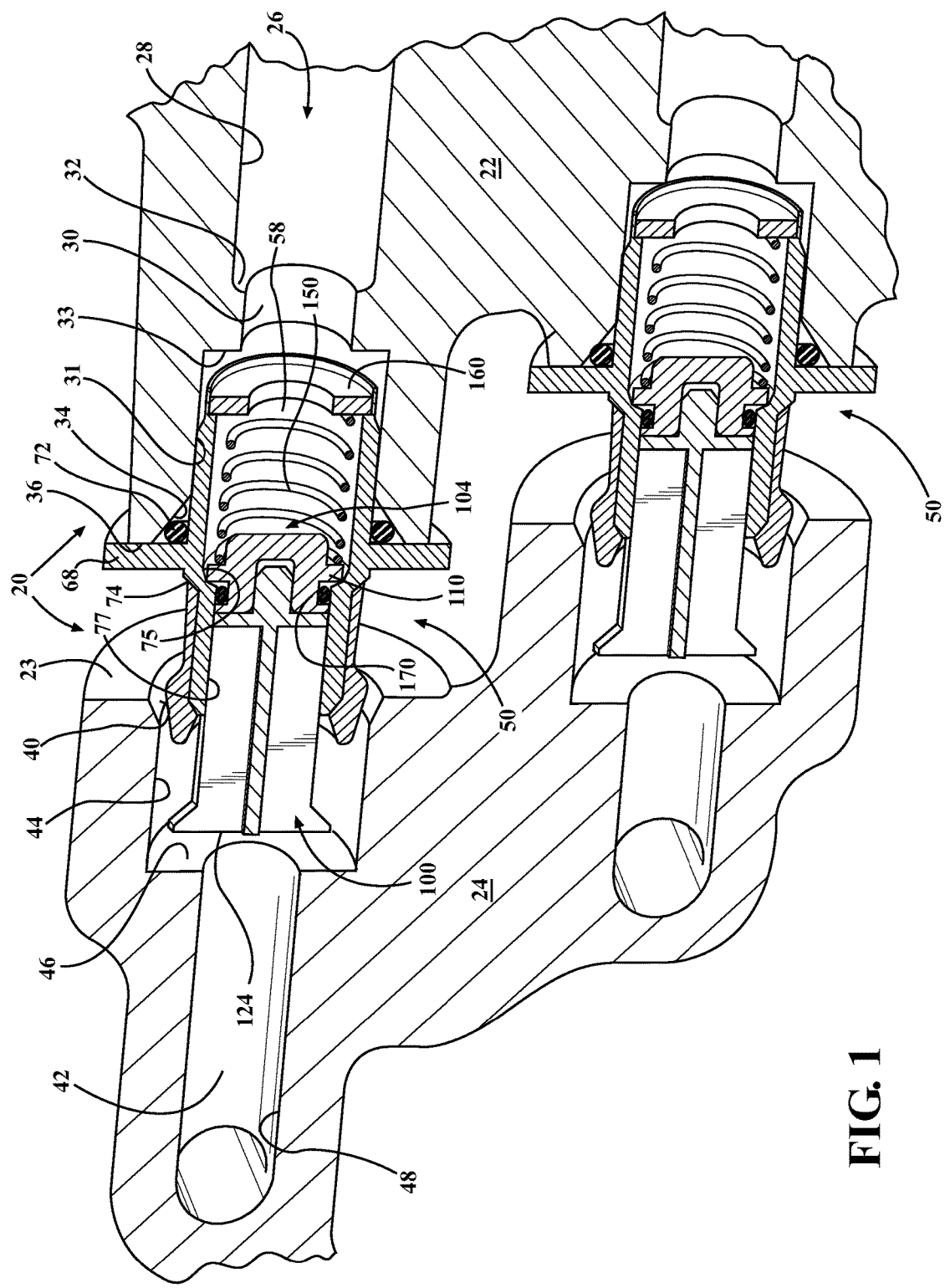
FIG. 1 is an exploded perspective view of a transmission with separable sections shown in the separated, spaced apart state, with one aspect of anti-leak valves mounted in one transmission section in a fluid blocking, closed position.

Referring now to the drawing, and at least to FIG. 1 in particular, there is depicted a cross sectional view of a vehicle transmission which is designed with separable sections. The vehicle transmission 20 includes, by example, vehicle transmission section 22 and vehicle transmission section 24.

For clarification purposes, the transmission sections 22 and 24 are depicted in FIG. 1 in a normal separated operative position. Separation of the sections 22 and 24 opens the internal fluid flow paths of each section 22 and 24 and would typically lead to leakage of the transmission fluid out from the internal passageways of transmission sections 22 and/or 24.

Figure 8:
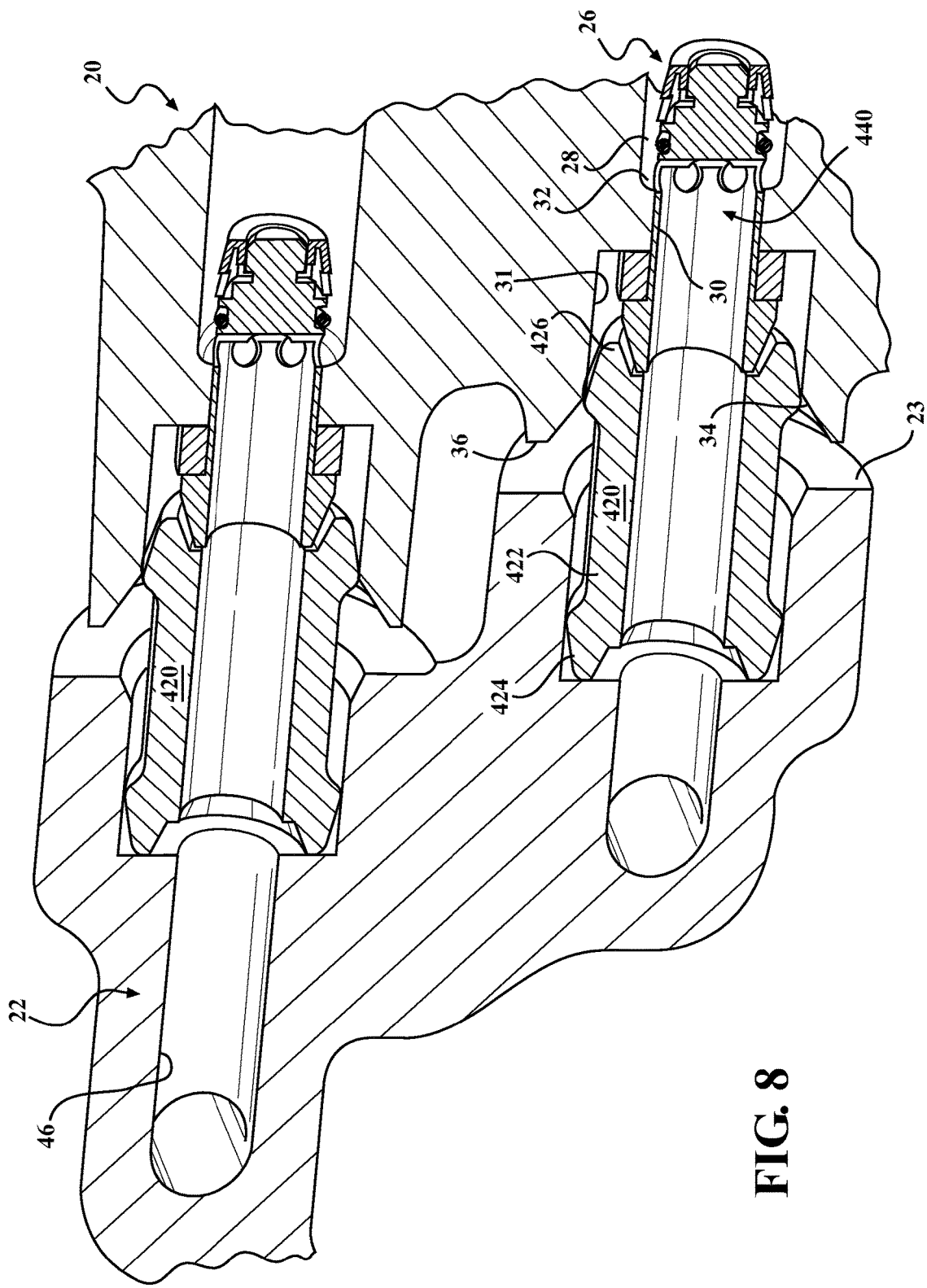
FIG. 8 is a perspective view of the multi-sectioned transmission of FIG. 6 in a closed, joined state with another aspect of the anti-leak valves depicted in a fluid flow, open position.

By way of example, transmission sections 22 and 24 include at least one fluid flow passageway, with two fluid flow passageways shown only by example. The at least one fluid passageway in the two transmission sections 22 and 24 is formed of a first bore 26 in the transmission section 22 and the second bore 42 in the transmission section 24. The first bore 26 has, by way of example, an irregular inner diameter shape, which necks down from a first diameter 28 to a smaller second diameter 30 to form a shoulder 32 at the transition between the first and second diameters 28 and 30. The first bore 26 continues from the second diameter 30 past a shoulder 33, through a large diameter bore section 31 shown in FIGS. 1 and 8 to an opening 34 in an outer surface 36 of the transmission section 22 which forms a facing surface facing or opposing an exterior facing outer surface 23 of the opposite transmission section 24.

The other section 24 of the transmission 20 has an opening 40 aligned with the opening 34 in the transmission section 22. The opening 40 is at one end of the second bore 42. The second bore 42 includes a first bore section 44 extending from the opening 40 at a first diameter to a shoulder 46. The second bore 42 transitions at the shoulder 46 to a second smaller diameter bore section portion 48 which continues through the second bore 42 to other fluid flow passage ways within the transmission section 24.

It will be understood that the transmission sections 22 and 24 may have a similar second pair of bores coaxially aligned, as shown in FIG. 1, to form a second fluid flow passageway.

Figure 6:
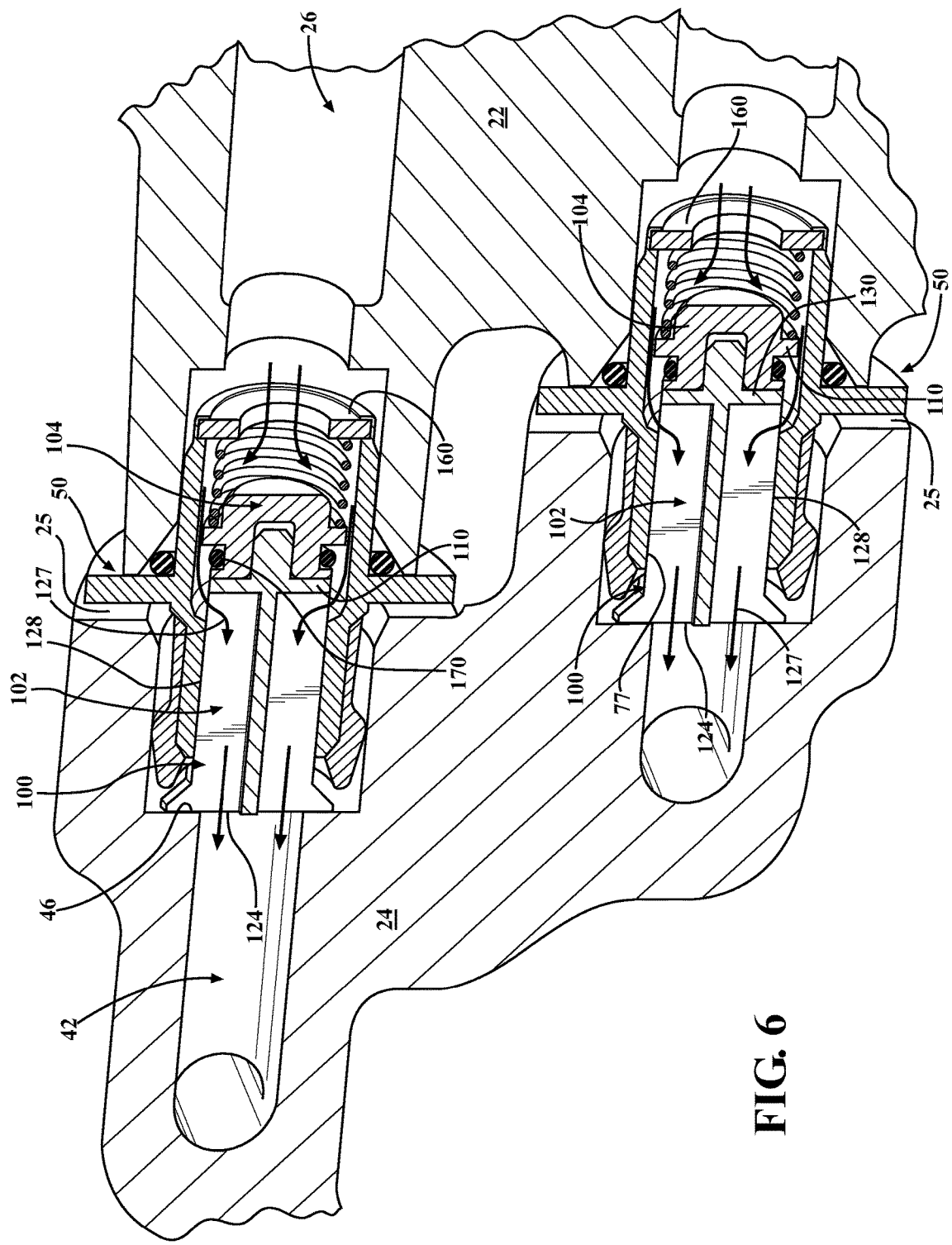
FIG. 6 is a perspective view of a multi-section transmission in a closed, joined state with the anti-leak valves depicted in a fluid flow, open position.

Although it is possible to form the opposed facing surfaces of the transmission section 22 and 24, with precision machine surfaces such that the open ends of the first and second bores 26 and 42 are coaxially aligned and made without any leakage of fluid from the aligned first and second bores 26 and 42, due to the typically irregular shape of the facing surfaces of the transmission sections 22 and 24, a small gap 25, FIG. 6, exists between the opposed faces of the transmission sections 22 and 24 even when the transmission sections 22 and 24 are in the joined position shown in FIG. 6. The gap 25 extends between the open ends of the first and second bores 26 and 42. In prior transmissions of this type, a transition member shown in FIGS. 8 and 13 and described hereafter is mounted in one of the bores. The transition member is in the form of a hollow tube constructed of or covered with a sealing material. In one example, one end of the transition member is mounted in the second bore 42, with an outer end projecting outward from the open end of the second bore 42. When the first and second transmission sections 22 and 24 are joined together, the outer end of the transition tube sealingly engages an inner surface in the bore 26 in the transmission section 22 to form a sealed fluid flow passageway between the first and second bores 26 and 42.

The no-leak feature of the transmission 20 is provided by a pair of valves, each noted by reference number 50 which are mounted in fluid communication in the aligned bores 26 and 42 in each passageway in the transmission sections 24 and 22, respectively. As each valve 50 is identically constructed, the construction and operation of one valve 50 will be understood to apply to both valves 50 shown in FIG. 1.

Each valve 50 is mounted in one of the bores 26 or 42 of the transmission sections 22 and 24. By way of example only, the valve 50 is mounted in the transmission section 22 in the first bore 26 as, in one example; the transmission section 22 provides a pressurized fluid flow through the first bore 26. The valve 50 functions to close or block fluid flow through the open end of the bore 26 when the transmission sections 22 and 24 are separated. Conversely, the valve 50 allows fluid flow between the first and second bores 26 and 42 in the transmission sections 22 and 24 wherein the transmission sections 24 and 22 are joined together.

In one aspect, the valve 50 forms a fluid flow path between the first bore 26 and the second bore 42 when the transmission sections 22 and 24 are joined together across the gap 25 between the facing surfaces of the transmission sections 22 and 24.

Figure 2:
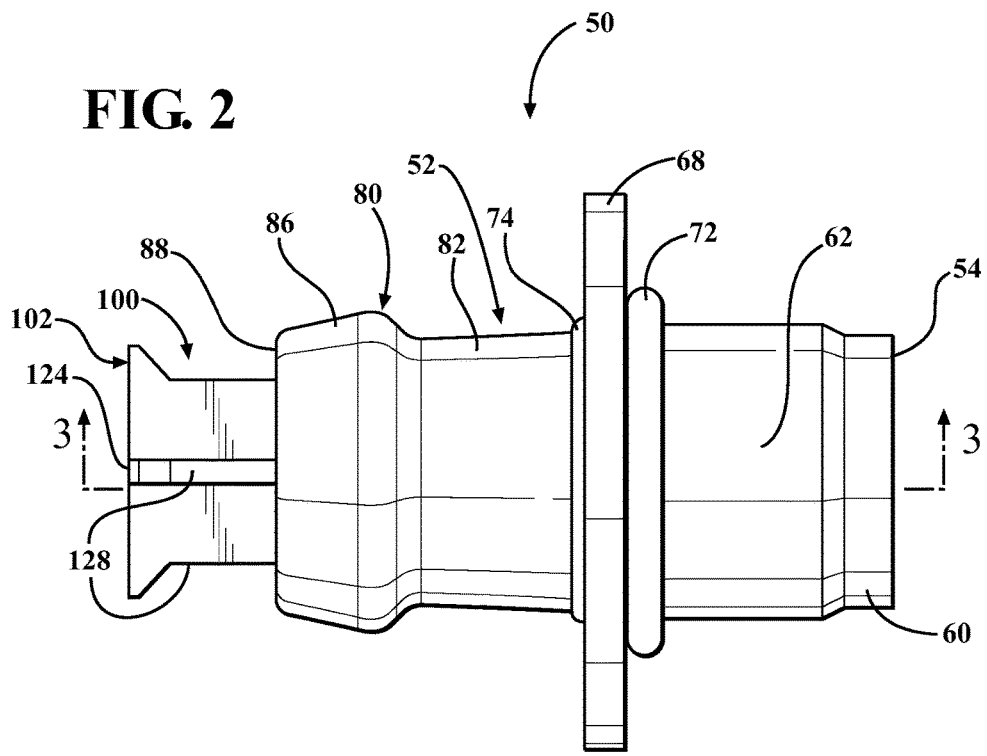
FIG. 2 is a side-elevational view of one of the anti-leak valves shown in FIG. 1.
Figure 3:
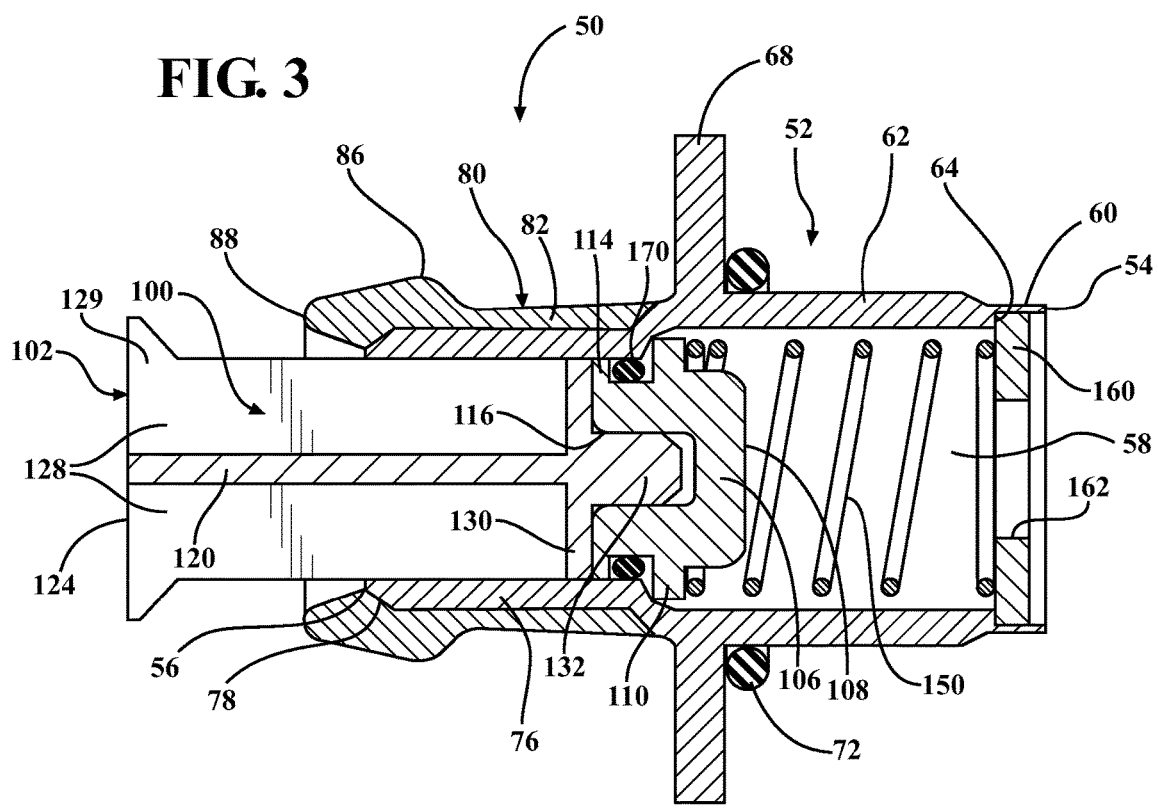
FIG. 3 is a cross-sectional view of the valve generally taken along line 3-3 in FIG. 2.

As shown in FIGS. 2, 3 and 4, the valve 50 includes a one piece body or housing 52 which is shown in its partially assembled state in FIGS. 2-4. The housing 52 has a first end 54 and an opposed second end 56.

Figure 5A:
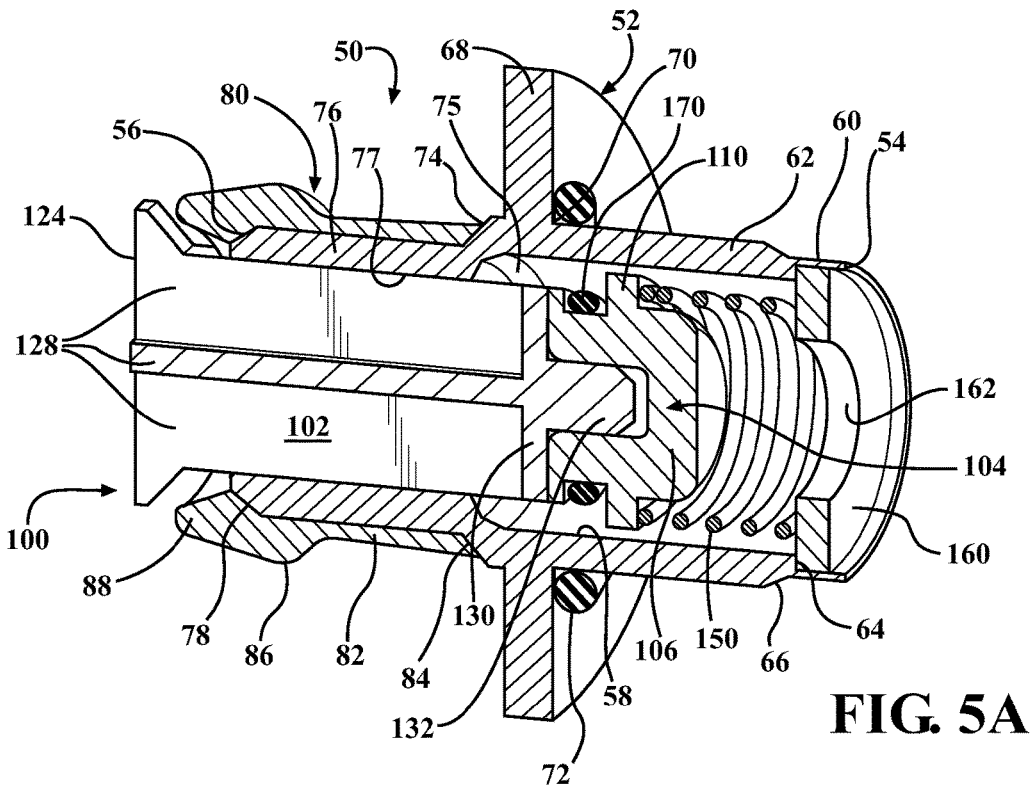
FIG. 5A is an enlarged, perspective view showing the valve in an open, fluid flow position.
Figure 5B:
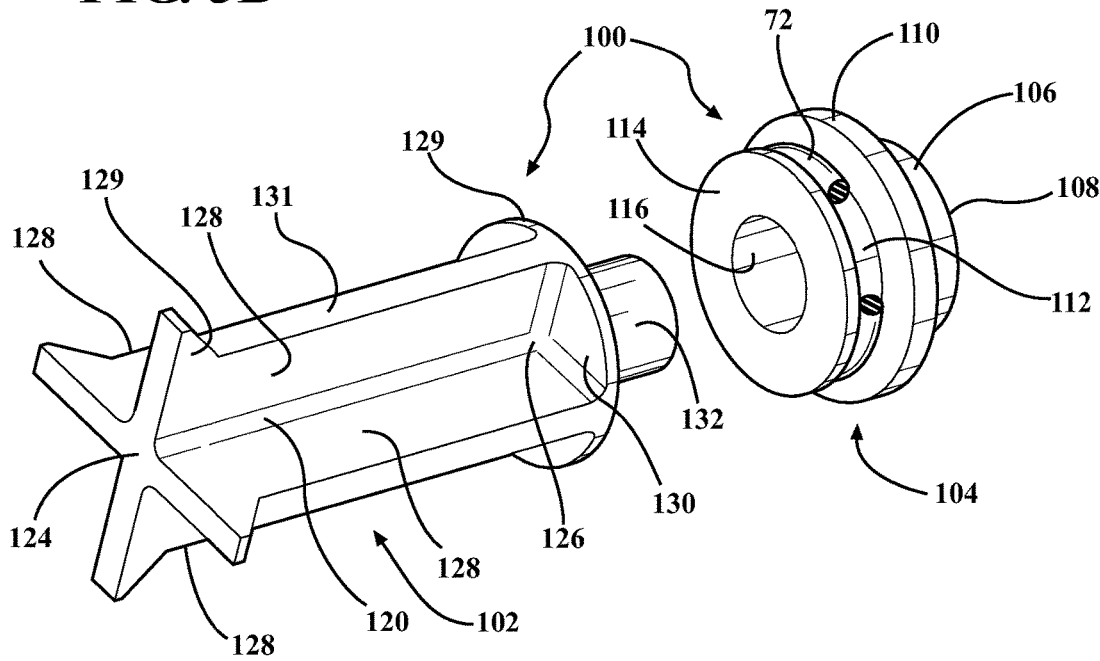
FIG. 5B is an exploded, perspective view of the plunger and cap shown in FIG. 5A.

A bore denoted generally by reference number 58 in FIGS. 1, 3 and 5A extends through the housing 52 from the first end 54 to the second end 56.

The housing 52 has a thin wall section 60 extending from the first end 54 to a thicker wall section 62. A generally flat or 90° shoulder 64 is formed internally of the thin wall section 60 at the junction with the thicker wall section 62. Similarly, an outward tapered shoulder 66 forms the transition from the thin wall section 60 to the thicker wall section 62.

The thicker wall section 62 has a constant diameter outer surface, the purpose of which will become more apparent hereafter.

The thicker wall section 62 terminates in an angularly extending, radially outward enlarged flange or collar 68. The juncture of the end of the thicker wall section 62 and the inner most periphery of the flange or collar 68 defines a corner 70 which may be enhanced by a small recess or groove suitable to retain a seal member, such as an O-ring 72, in the corner 70.

The collar 68 defines a stop surface which engages one exterior surface of the one transmission section 22 or 24, such as exterior surface 36 on the transmission section 22 surrounding the opening 34 in the bore 26.

The valve housing 52 continues from the collar 68 to an inward extending conical wall 74 which transitions into a constant diameter end section 76 terminating in the second end 56 of the valve housing 52. The second end 56 of the valve housing 52 may be tapered to form a conical surface 78 as shown in FIG. 5A.

An exterior seal 80 is mounted over and attached to the constant diameter end portion 76 of the valve housing 52. By way of example only, the seal 80 is over molded on the end portion 76 of the valve housing 52. The over-molded seal 80, when formed, has a slightly tapered conical wall section 82 extending from a first end 84 engaged with the conical wall 74 in the valve housing 52. The seal 80 has an enlarged tip 86 which tapers inward to a second end 88 spaced longitudinally outward from the second end 56 of the valve housing 52.

The over-molded seal 80 functions to seal the valve housing 52 to the internal surfaces of the shoulder 46 when the transmission sections 22 and 24 are joined together. Similarly, the O-ring 72 seals the valve housing 52 to the other transmission section 22.

A movable portion or member in the form of a plunger 100 is part of the valve 50 and is moveably responsive to engagement or disengagement the transmission section 24 as the sections 22 and 24 are urged together or separated. The movable plunger 100 is slidably disposed in the valve housing 52 for movement from a first extended position with respect to the second end 56 of the valve housing 52 to a second position forming a fluid flow allowing position of the valve 50 as shown in FIG. 5A.

The plunger 100, in one aspect, is formed as a two-part assembly including a stem 102 and a cap 104. The cap 104 in the form of a unitary one piece body formed of suitable plastic material and includes a semi-spherical shaped outer end 106 which has a flattened end surface 108, a larger diameter first flange 110, a radially inner cylindrical portion 112 which extends between the first flange 110 and a smaller diameter second flange 114. A hollow interior bore 116 extends from the outer end of the second flange 114 into the interior of the cap 104, generally to an end co-planarly aligned with the first flange 110.

The stem 102 is also formed, by example only, as a one piece unitary body of a suitable plastic material. The stem 102 includes a central spine 120 extending from a first end 124 of the stem 102 to a second opposed end 126. A plurality of circumferentially angularly disposed ribs, with four ribs 128 as shown by example, extend radially outward from the spine 120. With four ribs 128, the ribs 128 are spaced 90° apart and define fluid flow paths, as described hereafter, between the first end 124 of the stem 102 around a disk shaped end 130 of the stem 102 defined by a circular shaped flange having a projection 132 extending outward therefrom co-axially with the spine 120.

As shown in FIGS. 1-6, the ends of the ribs 128 adjacent the first end 124 of the spine 120 are tapered radially outward to form an enlarged diameter angled end portion 129 relative to the linear portion 131 of the axial extent of each rib 128. This prevents the plunger 100 from being forced inward into the valve housing 52.

The cap 104 is press fit onto one end of the stem 102 by a friction fit between the inner bore 116 and the projection 132 on the cap 104. In this press fit state, the flange 130 at the second end of the stem 102 is spaced from the first flange 110 on the cap 104. This provides a flow space for fluid between the exterior of the first flange 110 on the cap 104 and the flow paths between each pair of ribs 128.

The flange 110 also forms a seat for a biasing means 150 which can be in the form of a coil spring. The biasing means 150 has one end seated on the flange 110 of the cap 104, with the inner diameter of the biasing means 150 surrounding the semi-spherically shaped outer end 106 of the cap 104.

A retainer 160, generally in the form of a circular washer having a central aperture 162 is mounted through the first end 54 of the valve housing 52 and held against the shoulder 64 in the interior of the valve housing 52. The retainer 160 acts as a seat for the opposite end of the biasing means 150.

When the retainer 160 is firmly seated against the shoulder 64 in the interior of the valve housing 152, the thin wall end section 60 of the valve housing 52 is rolled-over or crimped on the circumferential periphery of the retainer 160 to fixedly hold the retainer 160 in position between the shoulders 64 in the valve housing 52.

In assembling the valve 50 to the transmission section 22, the first end 54 of the valve housing 52 is inserted into the enlarged bore portion 31 of the bore 26 in the transmission section 22. The outer diameter of the thicker wall section 62 adjacent the first end 54 of the valve housing 52 has a diameter sized to interfere with the inner diameter of the bore portion 31 to form an interference or friction fit. The valve housing 52 is forced under pressure into the bore portion 31 until the collar 68 contacts and abuts the exterior surface 36 in the transmission section 22. At this time, the first seal member or O-ring 72 engages the inner surface at the end of the opening 34 to seal the valve housing 52 to the transmission section 22.

Continuing with the assembly of the valve 50, the cap 104 is initially inserted through the open first end 54 of the valve housing 52. With the cap 104 forcibly held against movement, the projection 132 on the end of the stem 102 is pressed fit into the bore 116 in the cap 104 to unitarily join the cap 104 to the stem 102.

It will be understood that the reverse sequence of operation where the stem 102 is held in a stationary position within the valve housing 52 and the cap 104 pressed fit over the projection 132 on the stem 102 can also be employed.

Alternately, a cap 104 can be initially inserted through the open first end 54 of the valve housing 52. The biasing means 150 can then be inserted followed by the retainer 160. The outer edge of the thin wall section 60 of the valve housing 52 can then be crimped over the periphery of the retainer 160. The stem 102 of the plunger 100 can then be inserted through the open second end 56 of the valve housing 52 until the projection 132 engages the opening of the bore 116 and the cap 104. Continued pressured insertion of the stem 102 into the valve housing 52 will force the projection 132 into the bore 116 in the cap 104 in a tight, substantially non-separable friction or interference fit.

When the cap 104 is unitarily joined to the stem 102, the plunger 100 and the cap 104 are prevented from sliding out of the second end 56 of the housing 52 by the engagement of the large diameter first flange 110 on the cap 104 with inner surface 75 of the conical wall 74 in the intermediate portion of the valve housing 52.

The biasing means or spring 150 in then inserted through the open first end 54 of the housing followed by the retainer 160. The edge of the thin wall section 60 of the valve housing 52 is then rolled over and crimped in position holding the retainer 160 in a fixed position seated on the shoulder 64 adjacent the first end 54 of the valve housing 52.

In a closed position of the valve 50 shown in FIG. 1, which occurs when the transmission sections 22 and 24 are separated and not joined together in close contact or proximity, the biasing means or spring 150 exerts a force against the flange 110 of the valve 50 moving the plunger 100 to the first position shown in FIG. 1 wherein the first end 124 of the stem 102 of the plunger 100 extends axially outward from the second end 56 of the valve housing 52 and the second end 88 of the over molded seal 80. In this position, a second seal member, such as O-ring 170, which is mounted in a recess formed between the cylindrical portion 112 of the cap 104 and the adjacent spaced first and second flanges 110 and 114, sealingly engages an inner surface 77 of the constant diameter end section 76 of the valve housing 52 to seal fluid within the bore 26 in the transmission section 22. This prevents fluid from escaping from the transmission section 24 through the opening 34 when the transmission sections 22 and 24 are separated. It also allows the transmission section 22 to be prefilled with fluid and pressurized prior to mating with transmission section 24.

At the same time, the first flange 110 on the cap 104 engages the inner surface 75 of the conical walls 74 of the valve housing 52 to limit extension of the first end 124 of the stem 102 of the plunger 100 outward from the second end 56 of the valve housing 52.

An actuator is provided in the transmission sections 22 and 24 to actuate the movable member(s) of the valve 50 as the transmission sections 22 and 24 are urged together into the joined, fixed position and at the same time open the valve 50 to fluid flow through the first bore 26 to the second bore 42. In the example shown in FIGS. 1-7, the actuator is the inner shoulder 46 in the transmission section 24. Other examples of actuators will be described and illustrated in other aspects of the separable transmission 20.

Referring now to FIG. 6, when the transmission sections 22 and 24 are urged together in intimate contact for fixed joinder, the first end 124 of the stem 102 of the plunger 100 will initially engage the shoulder 46 in the end portion of the second bore 42 in the transmission section 24. As the transmission sections 22 and 24 are urged together, the shoulder 46 in the transmission section 24 acting as an actuator forces the plunger 100 of the valve 50 axially inward into the valve housing 52 to a second or open fluid flow position shown in FIG. 6. During this movement, the biasing means 150 compresses and the second seal member 170 disengages from contact with the inner surface 77 of the wall 75 in the valve housing 52.

As shown in FIG. 6, when the plunger 100 reaches the second open position, fluid flow paths 127 are formed between the ribs 128 on the stem 102 between the first end 124 of the stem 102 and an interior space surrounding the cap 104, the second seal 170 and the disc shaped end 130 of the stem 102. The fluid flow paths 127 allow fluid to flow through the bore 26 in the transmission section 22 to the bore 42 in the transmission section 24.

At any time the transmission sections 22 and 24 are separating, the relative movement between the facing exterior surfaces 36 and 23 of transmission sections 24 and 22, respectively, will allow the biasing means 150 in the valve 50 to extend the plunger 100 back to the first position wherein the flange 110 engages the inner surface 75 and the second seal 170 engages the inner surface 77 of the constant diameter end section 76 of the valve housing 52 closing off further fluid flow through the bore 26 in the transmission section 22.

Figure 7:
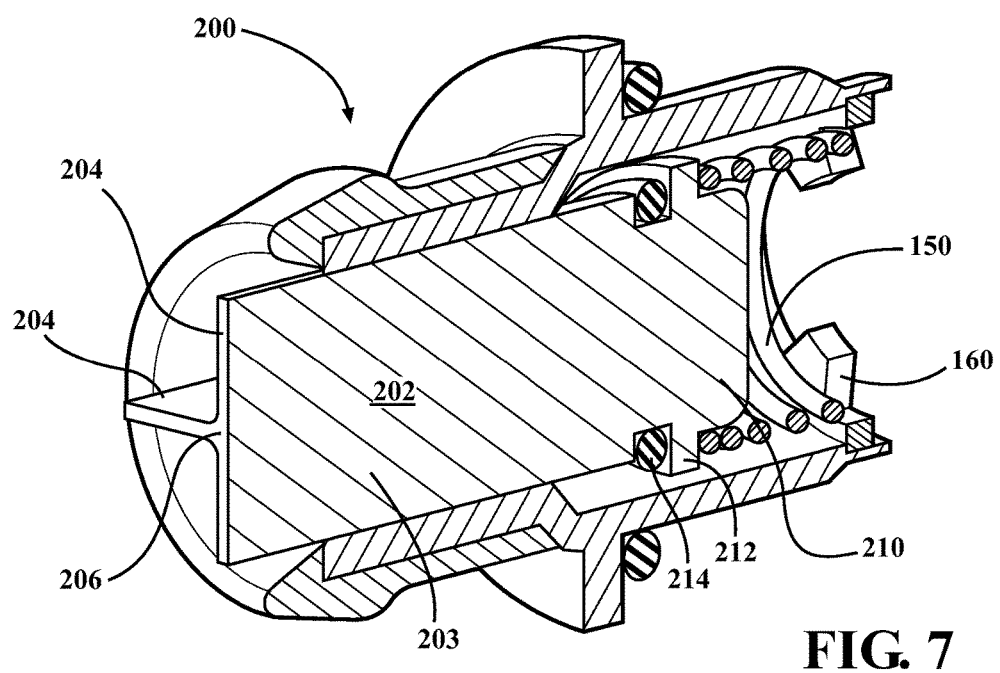
FIG. 7 is a perspective view of another aspect of an anti-leak valve for use in the multi-section transmission shown in FIG. 1.

In FIG. 7, a valve 200 is similarly constructed to the valve 50 except for the shape of a plunger 202. The plunger 202 is formed of a metallic material and has a stem 203 with a plurality of ribs, with four ribs 204 used by way of example extending radially outward from a central spine 206. The ends of the ribs 204 and one end of the spine 206 are co-planarly aligned as shown in FIG. 7.

The cap 104 of the valve 50 described above and shown in FIGS. 1-6 is replaced with a similarly shaped cap-like end portion 210 which is integrally formed as a single piece or unit with the stem 203 of the plunger 202. The plunger 202 is thus integrally formed as a one-piece body containing the stem 203 and the cap-like end portion 210 and a flange 212. With an O-ring 214. Otherwise, the function of the plunger 202 and the valve 200 are identical to that described above for the valve 50.

In this aspect of the valve 200, the plunger 202 is initially inserted through the open first end 54 of the valve housing 52 until the flange 212 engages the inner surface 75 of the conical wall 74. The biasing means 150 and the retainer 160 are then sequentially inserted through the open first end 54 of the valve housing 52 and the outer edge of the end of thin wall section 60 of the valve housing 52 rolled over or crimped in place about the periphery of the retainer 160.

In another aspect shown in FIGS. 8-17, the no-leak feature of the transmission 20 is provided by a valve 440, which is mounted in the second diameter portion 30 of bore 26 and moveable between a first, closed or fluid flow blocking position in which the valve 440 prevents fluid flow from the bore 26 through the opening 34 in the transmission section 22, when the transmission sections 22 and 24 are in a separated, spaced apart position, to a second, open, fluid flow allowing position which allows fluid flow from the bore 26 through the second bore 42 when the transmission sections 22 and 24 and are joined together.

In one aspect, the valve 440 includes a body 442. The body 442 may be a form of suitable high temperature resistant material, such as a metal, with aluminum being one example, or a plastic, such as nylon 12, for another example.

In the case of metal, the body 442 may be machined and/or cast to the illustrated shape. In the case of a plastic material, the body 442 may be molded and/or machined to the final shape shown in FIGS. 8-16.

By way of example, the body 442, in one aspect, includes a bore 444 extending from an opening 446 at a first end 448 of the body 442 to a closed second end 450 which terminates within the body 442 intermediate of the first end 448 and a closed second end 452 of the body 442.

The exterior surface of the body 442 includes a conical end section 454 extending from the first end 448 for a predetermined distance. The conical end section 454 transitions into a constant diameter portion 456, for example, before transitioning to a small diameter cylindrical surface 458 which extends at a constant diameter along an intermediate portion of the body 442. A shoulder 460 is formed between the end of the constant diameter portion and the reduced diameter cylindrical surface 458 of the body 442. The shoulder 460 acts as a seat for one end of a biasing means 480, such as a spring, described in detail hereafter.

The cylindrical surface 458 extends along the intermediate portion of the body toward the second end 452 on the body 442. A recess 462 is formed in the cylindrical surface 458 for receiving a seal 464, which may be an O-ring. After transiting outward at the end of the recess 462 back to the outer diameter of the cylindrical surface 458, the exterior surface of the body 442 transitions inward to a reduced diameter section 466. An inward projecting recess 468 extends radially inward from the section 466 to form a radially extending recess. The exterior surface of the body 442 then extends outward to form a cylindrical portion 470 extending to the second end 452 of the body 442.

A plurality of fluid flow apertures or outlets 472 are formed in a circumferentially spaced arrangement in the valve body 442. The apertures 472 extend through the wall of the cylindrical surface 458 and are located at the internal second end 450 of the bore 444 within the body 442. The apertures 472 allow fluid flow entering the bore 444 through the opening 446 in the first end 448 of the valve body 442 to be discharged from the valve body 442 into the surrounding area which, in the present case, is the bore 26 shown in FIG. 8.

Figure 10:
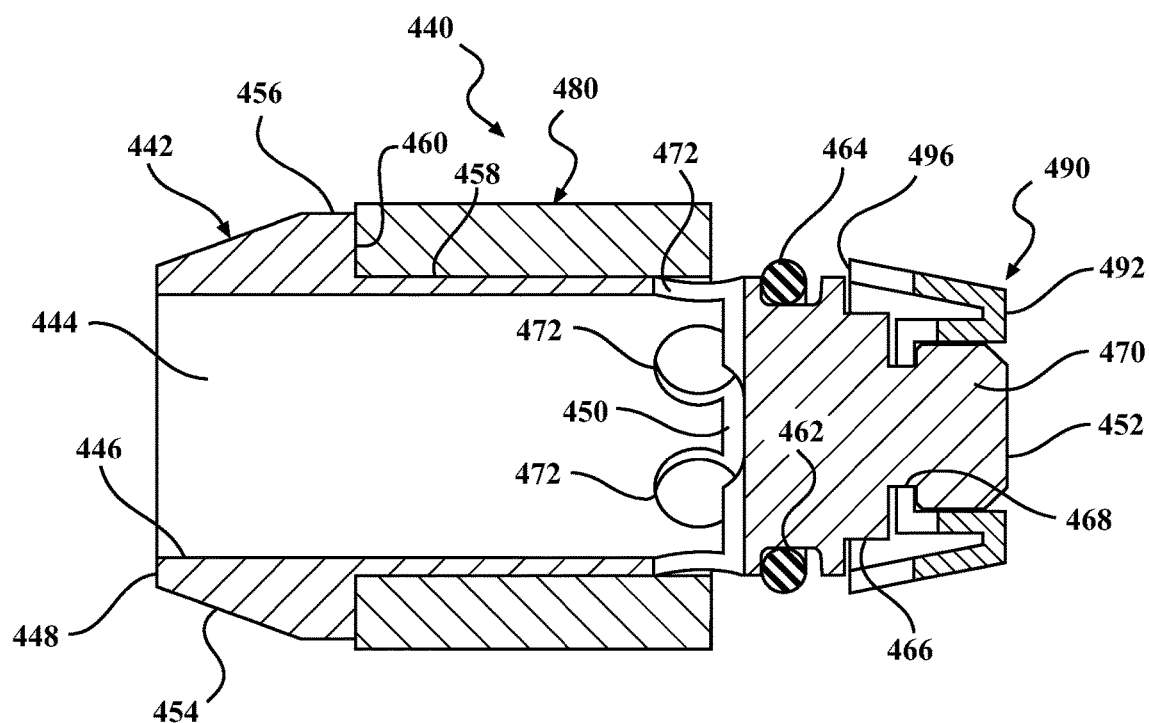
FIG. 10 is a longitudinal cross-sectional view of the aspect of the valve shown in FIG. 8, generally taken along the line 10-10 in FIG. 9.
Figure 11:
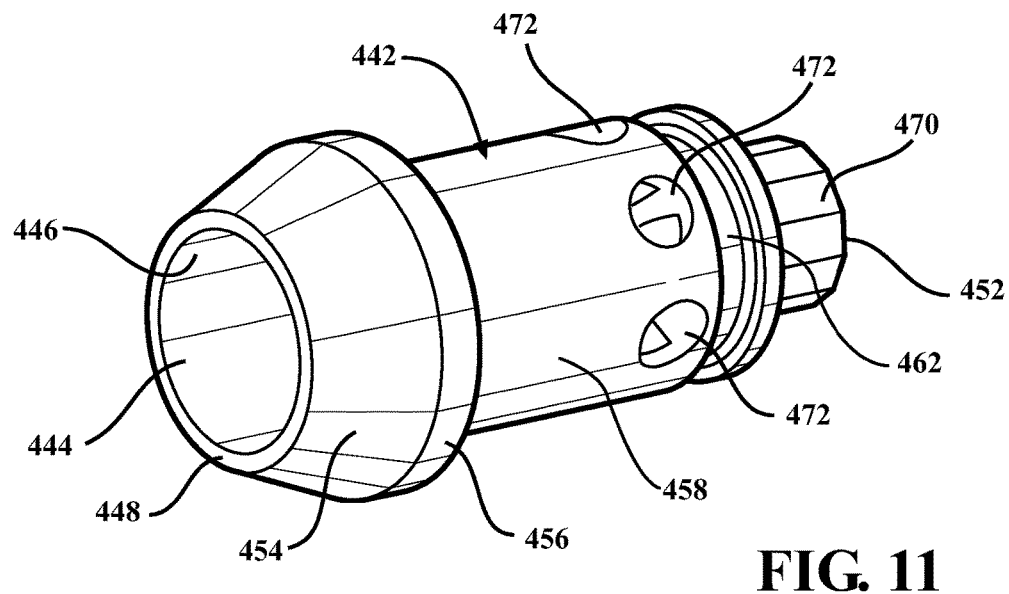
FIG. 11 is an enlarged perspective view of the valve body employed in the valve in FIGS. 9 and 10.

As shown in FIG. 10, a biasing means 480, such as a spring, is mounted about the cylindrical surface 458 and seats at one end against the shoulder 460 on the valve body 442. The biasing means or spring 480 functions to bias the valve 440 to the closed position within the bore 26 when the actuator, described hereafter, disengages from the valve body 442.

Although a coil spring could be used for the biasing means 480, in one example, a Smalley Stainless Wave Spring is employed. This spring has an advantage of space savings, as compared to coil springs, while still providing the necessary amount of spring force.

Figure 9:
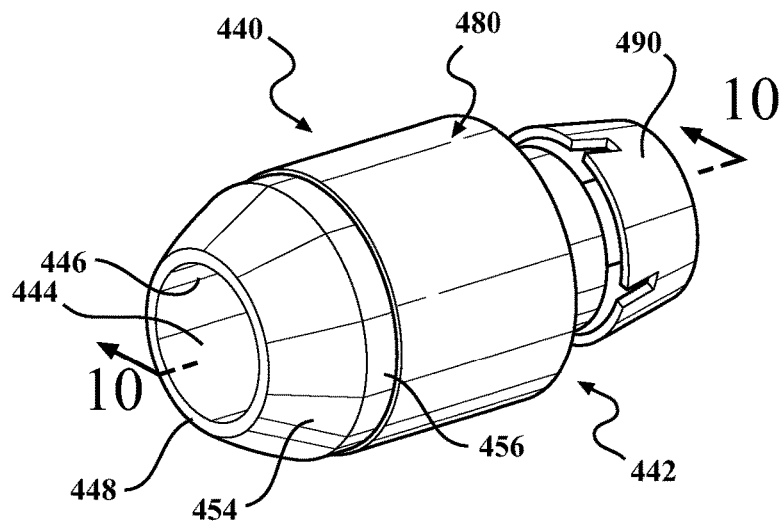
FIG. 9 is an enlarged, perspective view of the aspect of the valve shown in FIG. 8.
Figure 12:
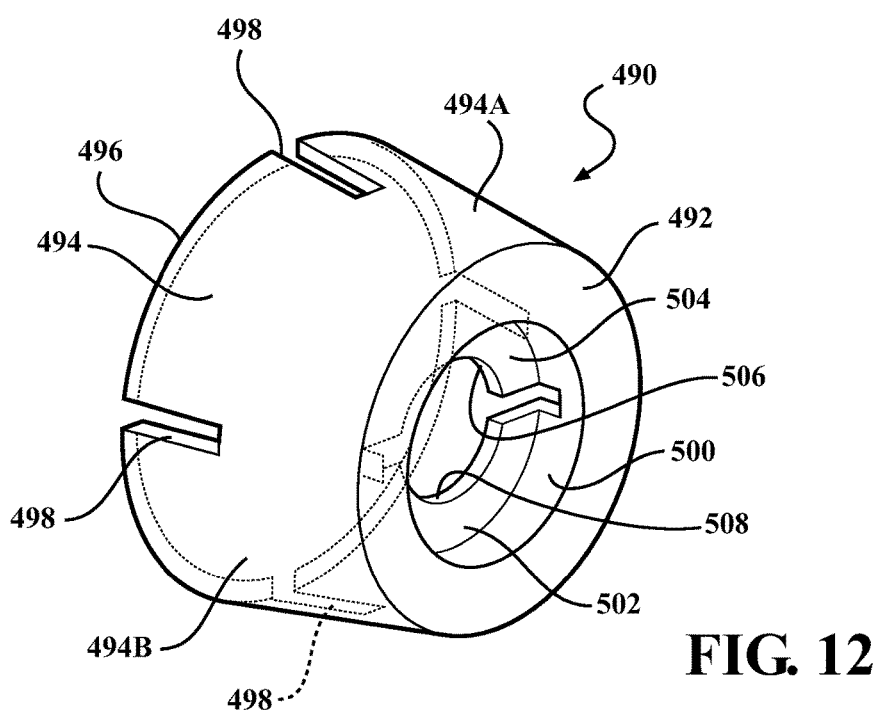
FIG. 12 is an enlarged perspective view of the cap mounted on the valve body depicted in FIG. 11.

As shown in FIGS. 9 and 10, and in greater detail in FIG. 12, a cap 490 is fixedly mounted on the body 442 and functions to prevent removal of the valve body 442 from the bore 26 in the transmission 20 when the valve 440 is moved to the first fluid flow blocking position. The cap 490 thereby serves as a stop limiter to define the first closed position of the valve 440 in the bore 26.

The cap 490 may be made of a suitable plastic such as an acetal, for example. The cap 490 has the angular ring-like first end 492. An outward tapered, conical surface 494 extends from the first end 492 to an opposed second end 496. The conical surface 494 includes a plurality of cutouts or notches 498, preferably formed in diametrically opposed pairs, which divide the conical surface 494 into a series of bendable wings, with diametrically opposed wings 494A and 494B shown by example in FIG. 12. In the normally relaxed radially outer disposed position shown in FIGS. 10 and 12, ends 496 of the wings 494A and 494B are disposed at an inner spacing or diameter which is greater than the inner diameter of the inner diameter portion 30 of the bore 26. This enables the ends 496 of the wings 494A and 494B to engage the shoulder 32 in the bore 26 to firmly seat the valve 440 in the first, fluid flow blocking position. The wings 494A and 494B also prevent separation of the valve 440 from the bore 26 though the opening 34 in the transmission section 22.

An inner surface 500 projects downward from the annular first end 492 of the cap 490. The inner surface 500 is divided into at least two separate sections 502 and 504 which respectively terminate in radially inward extending ribs or ledges 506 and 508. The ledges 506 and 508 are positioned to engage the recess 468 in the body 442 to fixedly lock the cap 490 on the body 442.

The wings 494A and 494B uniquely enable the entire valve 440 to be inserted from one side and in one direction of the transmission section 24. To install the valve 440 in the transmission section 24, the cap 490 is installed on the body 442 by forcibly urging the cap 490 over the cylindrical end 470 of the body 442. This initial forced engagement causes the ledges 506 and 508 to bend outward a slight amount until the outer edges pass the outer diameter of the cylindrical end 470 of the body 442. At a suitable insertion distance, the ledges 506 and 508 snap into the recess 468 in the valve body 442 to lock the cap 490 on the valve body 442.

In order to install the valve 440 in the bore 26, the valve 440 is inserted into the bore 26 through the opening 34 in the exterior surface 36 of the transmission section 22 cap 490 end first. The peripheral tip portion of the wings 494A and 494B of the cap 490 will engage in the inner diameter surface of the bore 26 and be forced radially inward into close proximity with the inner surface 500 of the cap 490 until the wings 494A and 494B reach a diameter allowing further insertion of the cap 490 past the shoulder 32. At this point, the wings 494A and 494B snap radially outward to a relaxed position. The biasing means 480 will bias the valve to the first, closed position shown FIG. 13 in which position the ends of wings 494A and 494B of the cap 490 firmly seat against the shoulder 32 in the bore 26.

The valve 440 is movable between the first and second positions through interaction with the first and second transmission sections 22 and 24 as the first and second transmission sections 22 and 24 are separated apart or moved toward each other into joined engagement. In one aspect, the valve 440 is moved between the first and second positions by an actuator carried by or formed on a portion of the second transmission section 24 as the second transmission section 24 is moved away from or toward the first transmission section 22.

Figure 13:
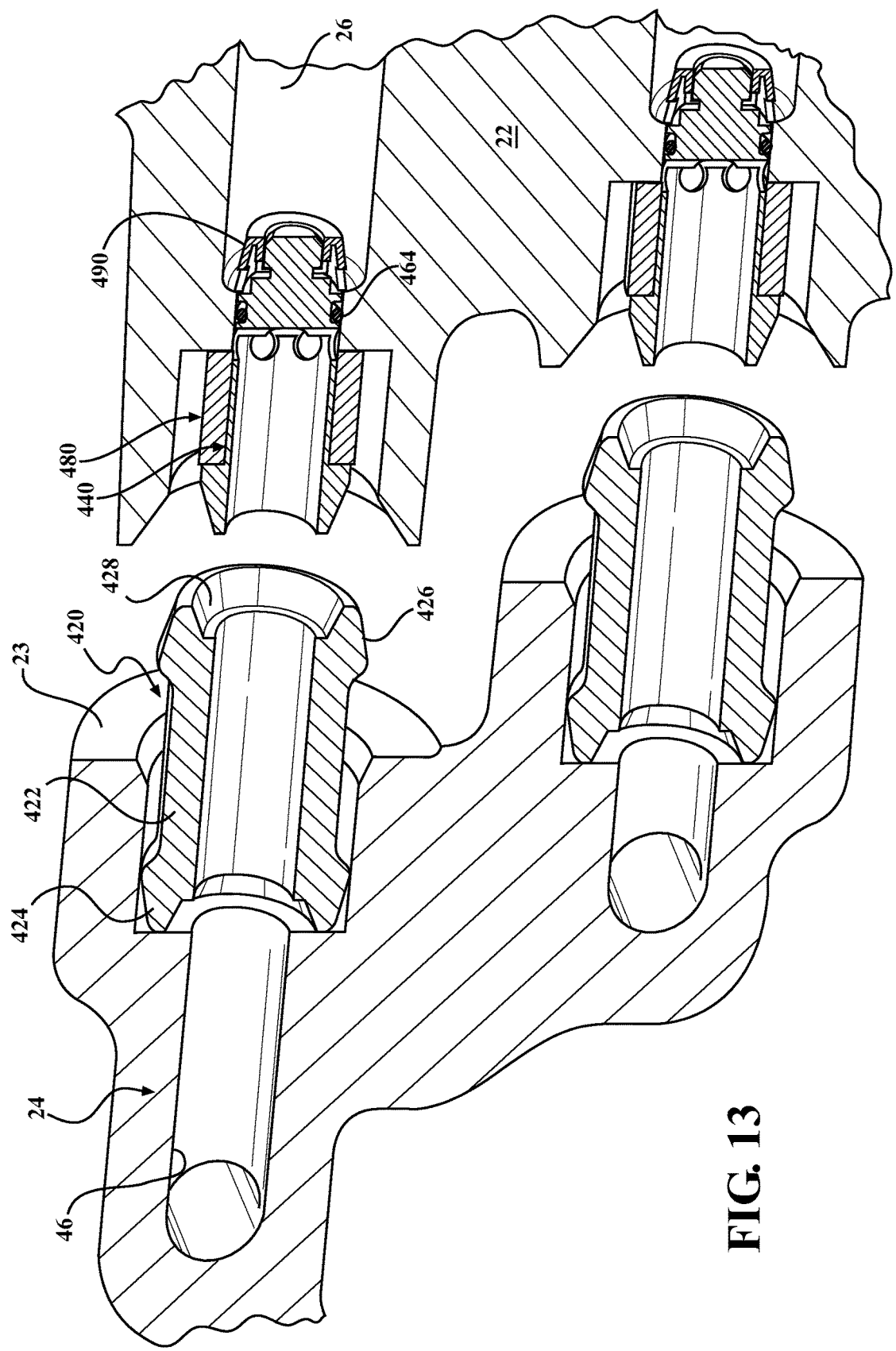
FIG. 13 is an exploded perspective view of a transmission with separable sections shown in the separated, spaced apart state, with the aspect of the valve shown in FIG. 9-11 depicted in a fluid flow blocking, closed position.

An actuator 420 seen in FIG. 13 is carried on and moves with the transmission section 24. The actuator 420, in one aspect, is a tubular sleeve 422 having a first end 424 firmly seated within at least a partial bore in the transmission section 24 and an opposed second end 426 which projects from the exterior surface 23 of the transmission section 24 into an end portion of the bore 26 in the opposite transmission section 22 to engage and move the valve 440 to the second, open position when the transmission sections 22 and 24 are joined together. The tubular sleeve 422 may be formed of any transmission suitable material. Further, the tubular sleeve 422 may be hollow or solid or have any other internal design. By way of example only, the second end 426 of the tubular sleeve 422 has an inner conical surface 428 complimentary to the shape of the conical surface 454 on the first end of the body 442 of the valve 440 to firmly engage and seat against the body 442.

When the transmission sections 22 and 24 are separated, the actuator 420 disengages from the valve 440. This disengagement allows the biasing means 480 to move the body 442 back to the closed position blocking fluid from discharging from the bore 26 while the transmission sections 22 and 24 are separated. When the transmission sections 22 and 24 are subsequently rejoined, the conical surface 428 of actuator 420 will engage the conical end 454 of the body 442 during an initial stage of reengagement of the transmission sections 22 and 24 and move the body 442 to second open position again allowing fluid flow from the bore 26 through the remaining flow passages in the transmission sections 22 and 24.

Figure 14:
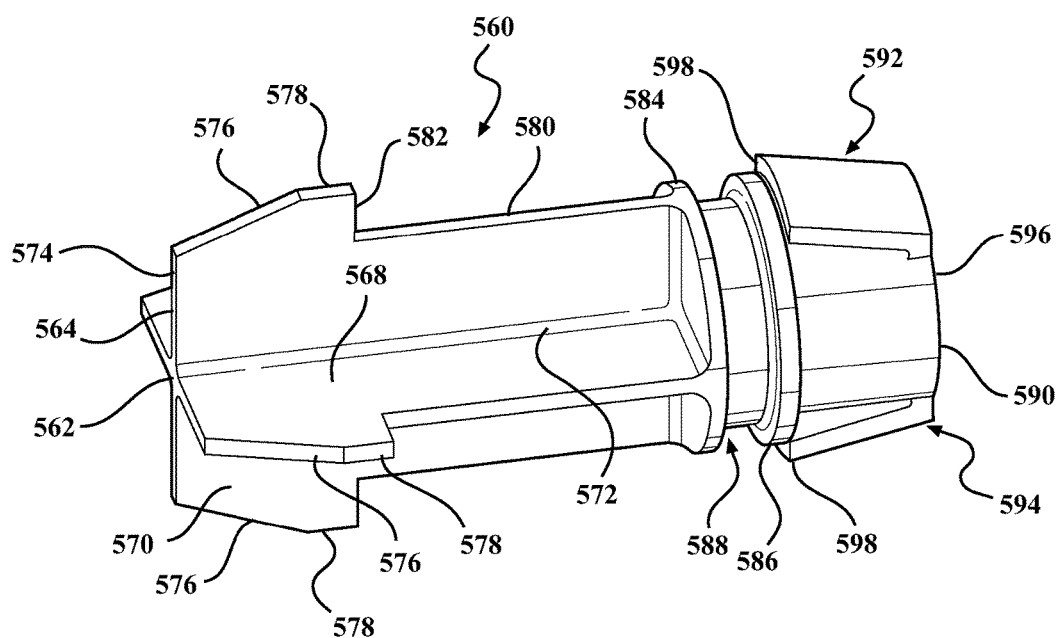
FIG. 14 is an enlarged, perspective view of another aspect of an integral valve body and cap.
Figure 15:
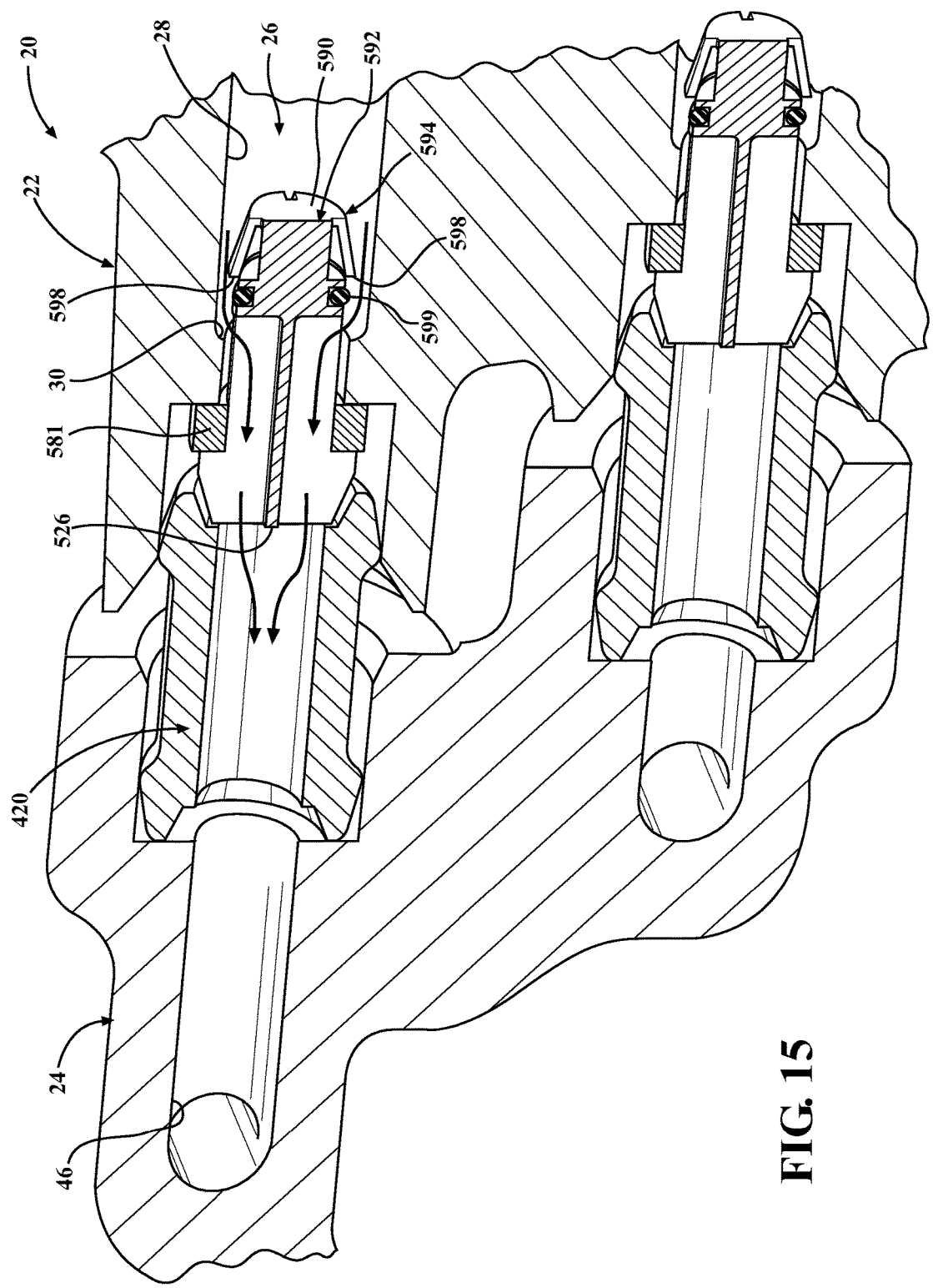
FIG. 15 is a perspective view of a multi-section transmission in a closed, joined state with the anti-leak valves showing the aspect depicted in FIG. 14 in a fluid flow, open position.
Figure 16:
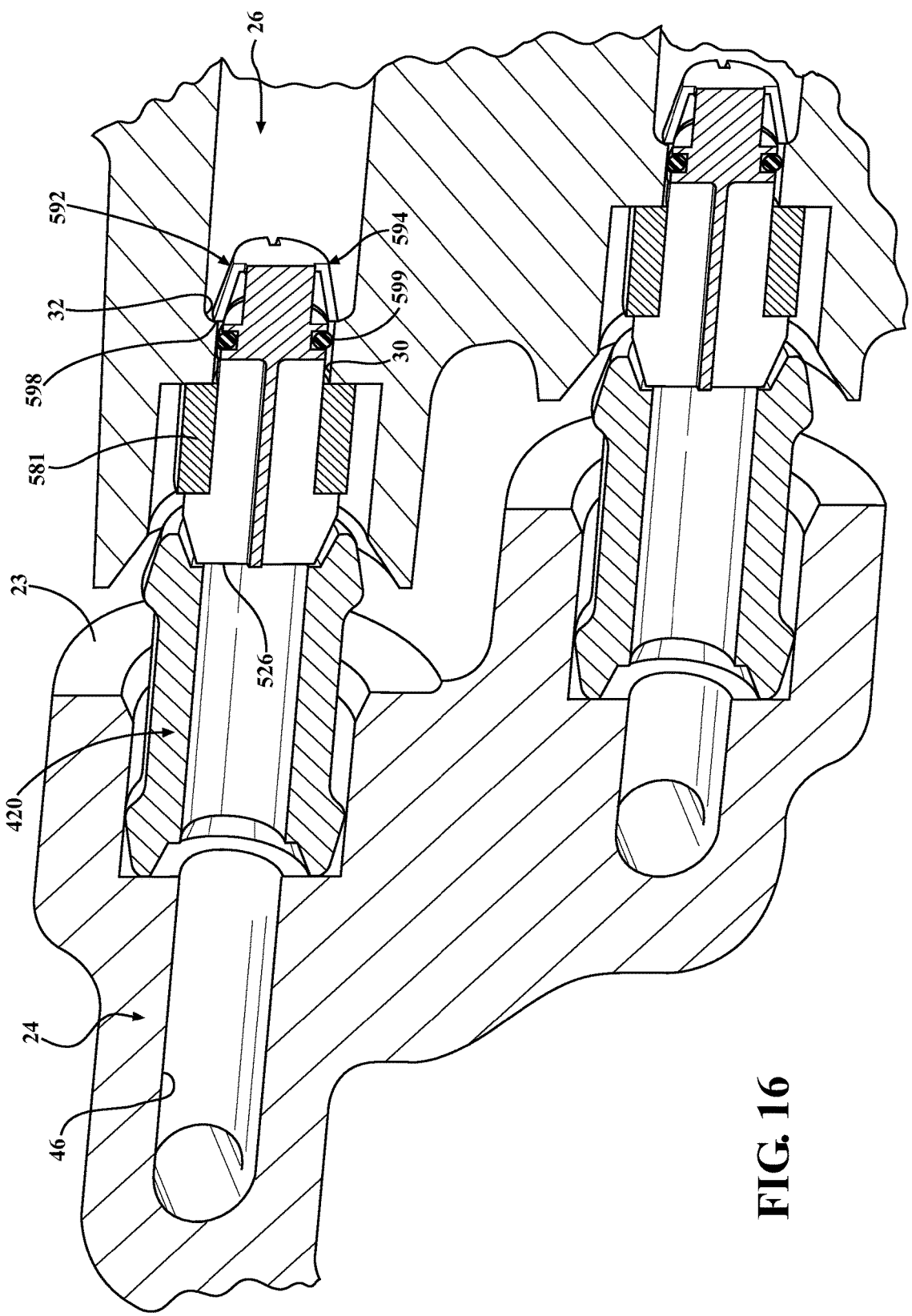
FIG. 16 is an exploded perspective view of the transmission with separable sections shown in the separated, spaced apart state, with one the aspect of the valves shown in FIG. 14 depicted in a fluid flow blocking, closed position.
Figure 17:
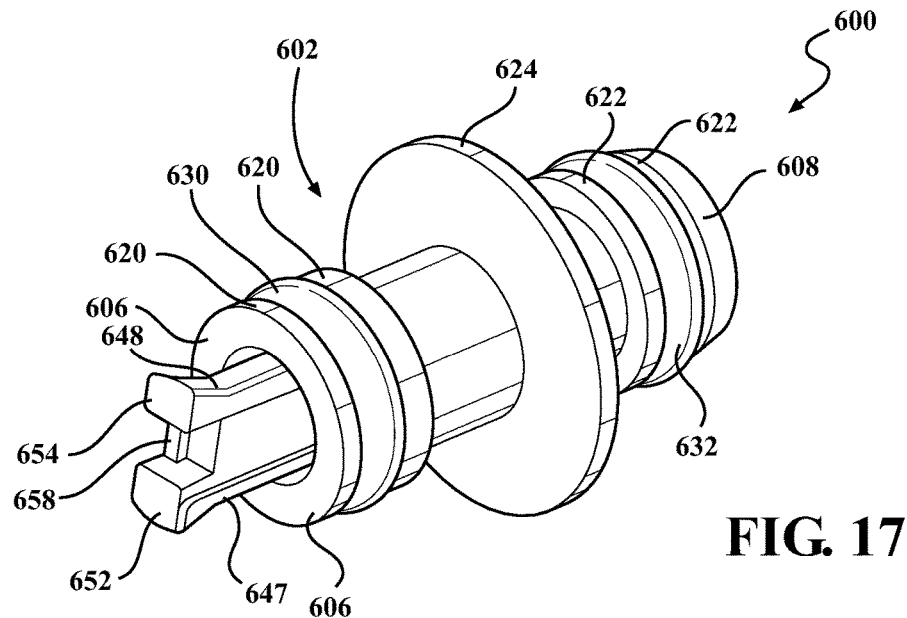
FIG. 17 is a perspective view of another aspect of a transmission anti leak valve.
Figure 18:
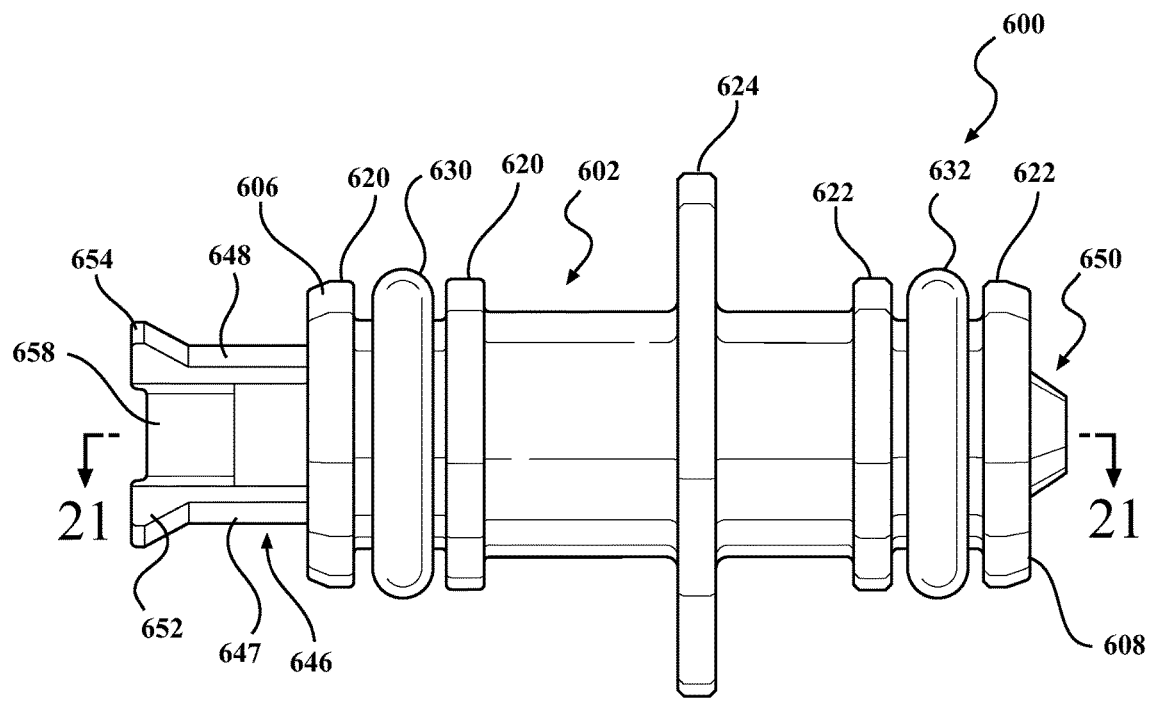
FIG. 18 is a side elevational view of the valve shown in FIG. 17.
Figure 19:
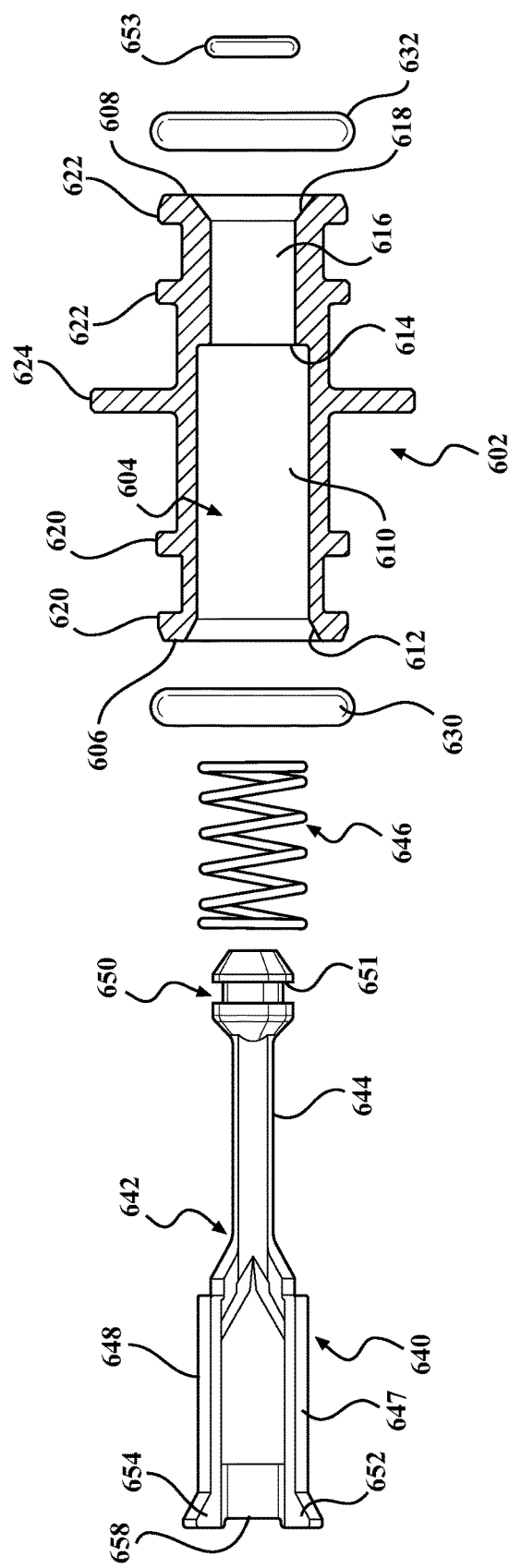
FIG. 19 is an exploded side elevational view of the components making up the valve shown in FIGS. 17 and 18.

Another aspect of a valve body 560 is shown in FIGS. 14, 15 and 16. In this aspect, the cap is integrated as a unitary part of the valve body 560.

The valve body 560 has a first end 562 from which a plurality of ribs, with four ribs 564, 566, 568 and 570, shown by way of example only, extend in a radially outward direction from a center axis or spine 572. The ribs 564, 566, 568 and 570 have an identical shape which includes a flat end wall 574 co-linear with the first end 562, and a conical or angled edge 576 which transitions into a constant diameter edge 578. The ribs 564, 566, 568 and 570 also have reduced diameter linear portion 580 which extends from a shoulder 582 positioned between an end of the linear portion 580 and the constant diameter portions 578 of each rib. The linear portions 580 of each of the ribs 564, 566, 568 and 570 terminate in an annular, solid first disc 584. A substantially constant diameter second disc 586 is also formed on the valve body 560 and spaced from the disc 584 to form a recess 588 for a seal member, such as an O-ring 599. A constant diameter cylindrical end portion 590 extends from the second disc 586. A plurality of wings, with two wings 592 and 594 shown by way of example are integrally formed with the cylindrical end portion 590 and are connected to the cylindrical end portion 590 adjacent a cylindrical second end 596 of the valve body 560. The wings 592 and 594 taper slightly angularly outward from the exterior surface of the second end 596 from the connection to the second end 596 to a free, movable end 598. The moveable ends 598 of the wings 592 and 594 are normally spaced apart in a relaxed position at a diameter greater than the inner diameter of the bore 26. This allows the ends 598 of the wings 592 and 594 to forcibly engage the shoulder 32 formed between the different diameter portions 30 and 28 of the bore 26 to seat the valve 440 in the bore 26 when the valve body 560 in the first, closed, fluid blocking position.

A biasing means 581, such as a biasing similar to the biasing means or spring 480 shown in FIG. 10, is mounted about the exterior surface of the linear portion 580 of each rib 564, 566, 568 and 570 and seats at one end against the shoulder 582 and an inner wall of the transmission section 22. The biasing means 581 serves the same function as the biasing means or spring 480 in the prior aspect of the body 442.

In use, the actuator 420, shown in FIG. 15, engages and moves the valve body 560 to the second, open, fluid flow allowing position as the first and second transmission sections 22 and 24 are moved toward each other into joined engagement. The actuator 420 will initially engage either or both of the end walls 574 or the conical edges 576 of each of the ribs 564, 566, 568 and 570 to firmly engage the valve body 560 for movement to the second valve position. When in the second position shown in FIG. 15, annular passageways, denoted by the arrows in FIG. 15, are formed between adjacent pairs of ribs 564, 566, 568 and 570 and the surrounding portion of the bore 26 in the transmission section 22 to allow fluid flow from the opening 34 at the bore 26 in either direction, such as from the first end 562 of the valve body 560 through the annular passageways and out of the ends of the annular passageways adjacent the annular disc 584 and into the main portion of the bore 26. An opposite fluid flow direction through the bore 26 and the valve body 560 toward the opening 34 of the transmission section 22 is also possible.

When the transmission sections 22 and 24 are separated, as seen in FIG. 16, the relative movement of the transmission section 24 away from the end of the transmission section 22, or vice versa, disengages the actuator 420 from the end of the valve body 560. This allows the biasing means or spring 581 to move the valve body 560 to the first closed position in which the end of the body 560 projects exteriorly of the end of the transmission section 22. The seal member or O-ring 599 engages an inner surface of the second diameter portion 30 of the bore 26. At the same time, the ends 598 of the wings 592 and 594 engage the shoulder 32 in the bore 26 stopping further movement of the valve body 560 and in conjunction with the seal member 599 defines the first closed, fluid flow blocking position of the valve body 560. In this position, the valve body 560 automatically closes off fluid flow which might occur through the open end of the bore 26 when the transmission sections 22 and 24 are separated.

Referring now to FIGS. 17-23, there is depicted a valve 600 which can be used with the separable transmissions sections 22 and 24 to serve the same function as the valve 50 described above and shown in FIG. 1, insofar as opening and closing fluid flow paths through the transmission sections 22 and 24 depending upon the separation or joinder of the transmission sections 22 and 24.

The valve 600 is constructed somewhat similarly as the valve 50 and includes a body 602 from the metal or plastic, as explained above for the construction of the valve body 52. The body 602 has an internal through bore 604 extending through the body 602 between an aperture in a first end 606 of the body 602 and in an opposed second end 608 of the body 602. The bore 604 can have any suitable cross-section profile such as a larger diameter first bore portion 610 extending from a tapered end 612 at the first end 606 of the body 602 in an intermediate portion of the body 602.

The first bore portion 610 terminates in a shoulder 614 which transitions radially inward to a smaller diameter second bore portion 616 extending to a conical shape surface 618 at the second end 608 of the body 602.

The exterior surface of the body 602 has a generally cylindrical form between the first and second ends 606 and 608. A first pair of raised radially extending collars or annular flanges 620 are formed on and spaced from the first end 606. Similarly, the second pair of enlarged radially extending collars or annular flanges 622 are formed on and spaced from the second end 608 of the body 602. A larger diameter annular collar 624 is located intermediately on the body 602 between the first and second ends 606 and 608. The collar 624 acts an insertion limiter when the body 602 is mounted in one of the transmission sections, such as transmission section 22 as shown in FIGS. 22 and 23.

As shown in FIGS. 17 and 20-23, a first seal member 630, which can be an O-ring, is mounted on the body 602 between the first pair of flanges 620 adjacent the first end 606 of the body 602.

A second seal member 632, which can also be an O-ring is mounted between the second pair of flanges 622 at the second end 608 of the body 602.

Figure 20:
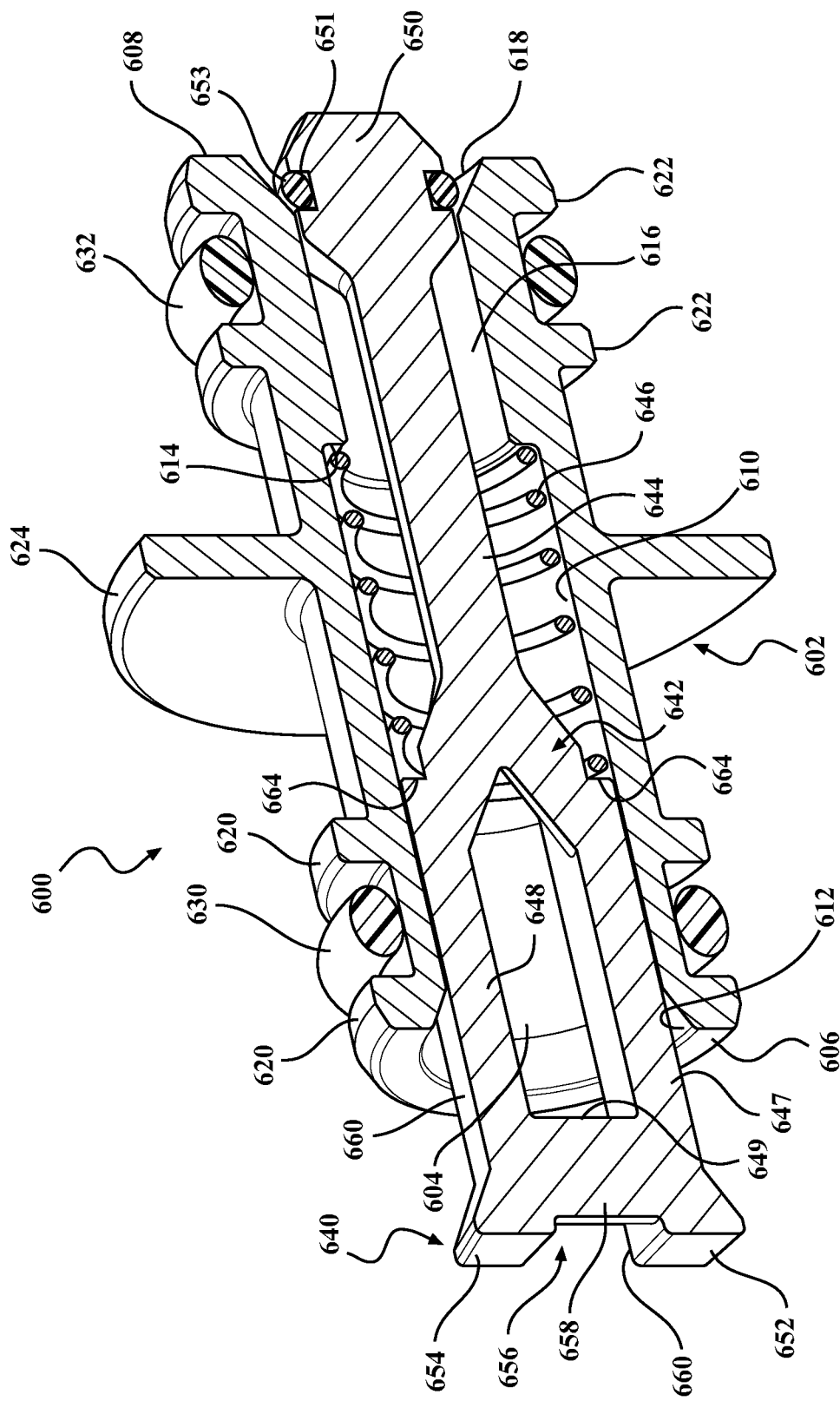
FIG. 20 is a longitudinal cross-section of the assembled valve shown in FIGS. 17 and 18.
Figure 21:
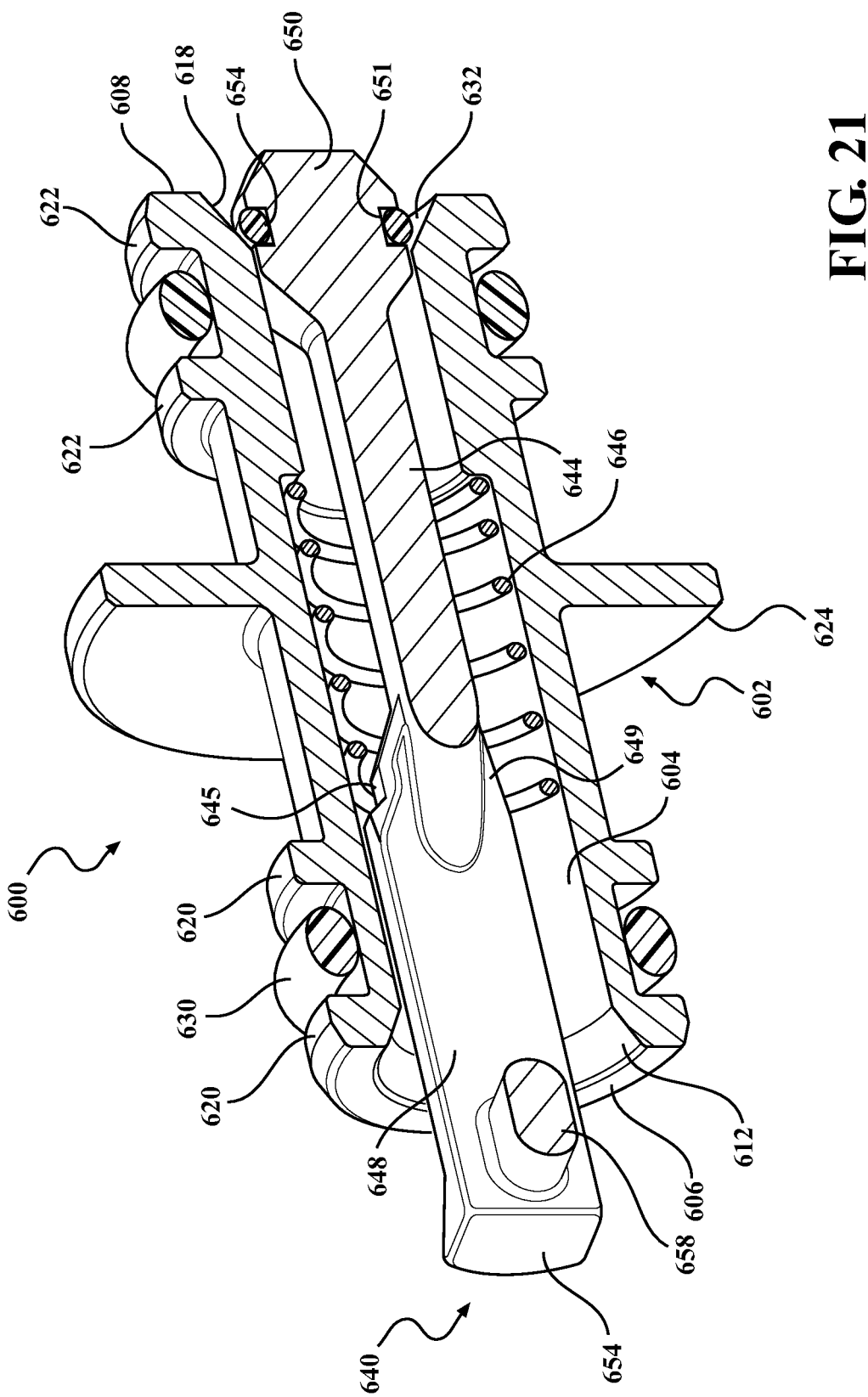
FIG. 21 is a longitudinal cross-section of the assembled valve shown in FIGS. 17 and 18, generally taken along lines 21-21 in FIG. 18.
Figure 22:
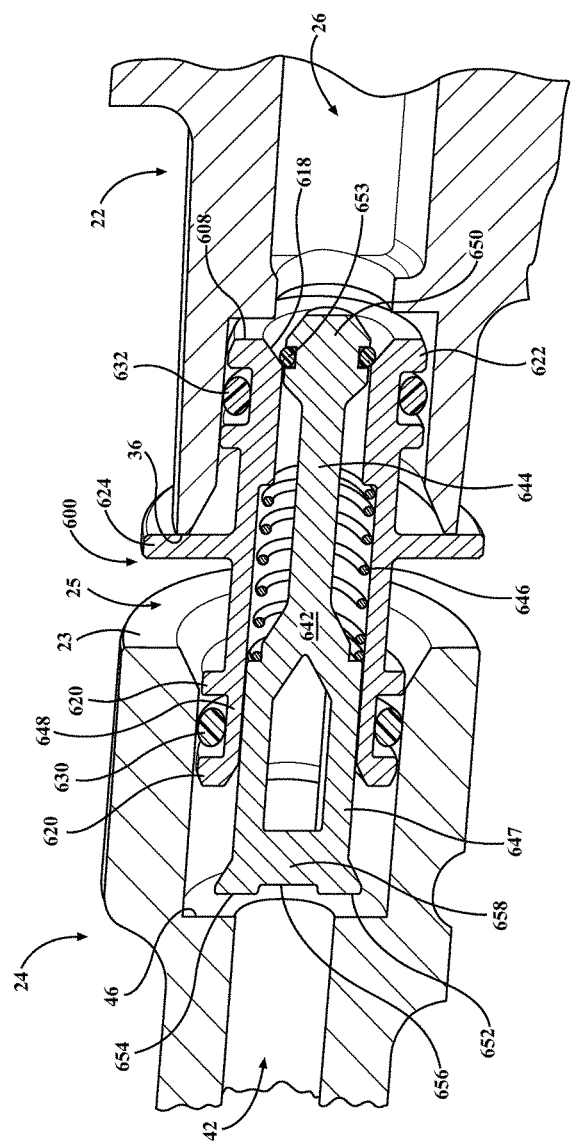
FIG. 22 is an exploded perspective cross-sectioned view of a transmission with separable sections shown in a separated, spaced apart state, with one aspect of an anti-leak valve mounted in one of the transmission sections in a fluid blocking, closed position.
Figure 23:
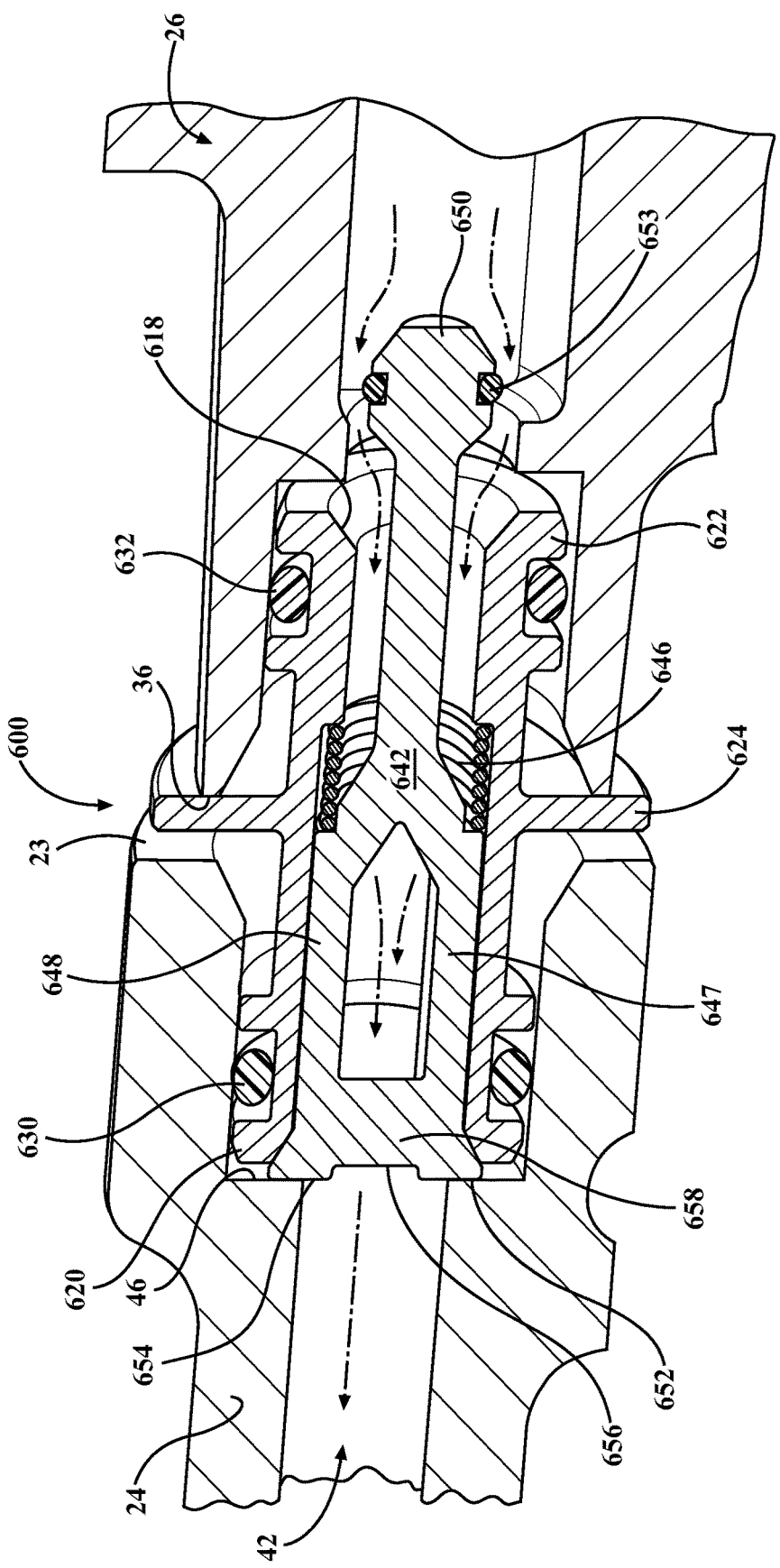
FIG. 23 is perspective cross-sectioned view of the multi-sectioned transmission in a closed joined state with the anti-leak valve depicted in a fluid flow, open position.

A plunger 640 is movably disposed within the bore 604 of the body 602 for movement between a first position shown in FIGS. 20 and 22 and a second position shown in FIG. 23. In the first position, the plunger 640, as described hereafter, closes the opening at the second end 608 of the body 602 to fluid flow thereby blocking fluid flow from the transmission section, such as transmission section 22, in which the second end 608 of the body 602 is mounted. In the second position shown in FIG. 23, the plunger has been moved, as described hereafter, to an open position allowing fluid flow through the bore 604 in the body 602 of the valve 600. This places the spaced bores in the transmission sections 22 and 24 in fluid flow communication for fluid flow between the bores in the transmission sections 22 and 24, as described above for the valve 50.

The plunger 640 can be formed as a unitary, one piece member or a plurality of separate individual components unitarily joined together into a single unit. The plunger 640 includes a valve stem 642 having an elongated shaft 644 which transitions into a pair of fingers 647 and 648 which are separated by a channel 649. The fingers 647 and 648 terminate in radially outward extending tapered end flanges 652 and 654, respectively. The end flanges 652 and 654 are positioned at a first end 656 of the plunger 640.

A rib 658 extends transversely at one end of the channel 649 to space the end flanges 652 and 654 apart. As shown more clearly in FIGS. 17 and 20, the end flanges 652 and 654 project laterally outward beyond the rib 658.

The fingers 647 and 648 project longitudinally from one end of the shaft 644. Angled joinder members 645 and 649 respectively join the fingers 647 and 648 to one end of the shaft 644. The spaced fingers 647 and 648, the end flanges 652 and 654 and the rib 658 form longitudinally extending or axial fluid flow passages through the channel 649 around the fingers 647 and 648 of the plunger 640 for fluid flowing through the bore 604 in the body 602 of the valve 600, as described hereafter.

A notch-shaped shoulder 664 is formed at an end of the fingers 647 and 648 opposite the end flanges 652 and 654. The shoulder 664 forms a seat for one end of a spring 646, which may be in the form of a coil spring 646 mounted within the first bore portion 610. The opposite end of the spring 646, seats against the shoulder 614 formed between the first bore portion 610 and the second bore portion 616 in the bore 604 of the body 602. The spring 646 provides a biasing force to bias the plunger 640 to the left in the orientation of the valve 600 shown in FIG. 20 or to the first position wherein the plunger 640 closes fluid flow through the bore 604 in the body 602.

The opposite end of the shaft 644 is in the form of an enlarged, polygonal shaped plug 650. The plug 650 extends radially outward from edges of the shaft 644 to an outer diameter slightly smaller than the inner diameter of the second bore portion 616. An annular groove 651 is formed in the periphery of the plug 650 and receives an exterior seal member, such as an O-ring 653 in which is positioned to sealing engage the conical surface 618 at the second end 608 of the body 602 as the first position of the plunger 640.

To assemble the valve 600, the spring 646 can be inserted from the first end 606 into the bore 604 independent of the insertion of the plunger 640. Alternately, the spring 646 can be loosely disposed about an intermediate portion of the plunger 640, such as about the shaft 644 and then the plunger 640 and the spring 646 inserted into the body 602. During the insertion of the plunger 640, the plug 650 of the plunger 640 is inserted first through the opening at the first end 606 of the body 602. The plunger 640 is forcibly pushed through the bore 604 in the body 602 to overcome the resistance of the spring 646 seated between the shoulders 614 and 664. Continued insertion force exerted on the plunger 640 after the initial resistance is met compresses the spring 646 and enables the plug 650 to project outward of the second end 608 of the body 602. The O-ring 653 is then mounted in the groove 651 in the plug 650.

At this time, insertion force is removed from the plunger 640. The spring 646 then expands biasing the plunger 640 to the left in the orientation shown in FIGS. 20 and 21 until the O-ring 653 sealingly engages the conical surface 618 at the second end 608 of the body 602. The O-ring 653 sealingly closes off the bore 604 in the body 602 to fluid flow which blocks fluid flow from the bore in the transmission section 22 into the corresponding bore in the transmission section 24.

As shown in FIGS. 17-22, the valve 600 is in the first position blocking fluid flow to the bore 604 in the body 602 and from the transmission section 22 in which the body 602 is mounted. In this first position, the end flanges 652 and 654 of the plunger 640 project outward from the first end 606 of the body 602.

When the transmission sections 22 and 24 are brought together into engagement, the end flanges 652 and 654 of the plunger 640 slide into the bore 42 in the transmission section 24 until the end flanges 652 and 654 contact an actuator in the bore 42. The actuator can be in the form of any of the actuators described above and shown in FIGS. 1-18, including an internal shoulder 46 in the bore 42 in the transmission section 24 or a separate sleeve or tubular shaped member mounted in the bore 42.

It should be noted, as shown in FIG. 22, when the transmission sections 22 and 24 are brought together into engagement, one or more areas at the interface between the facing exterior surfaces 36 and 23 of the transmission sections 22 and 24 may have a slight gap or clearance 25 therebetween. This gap 25 is provided for tolerance stack of the components. The gap 25 is spanned by the valve 600 when the gap 25 is at the location of the bores 26 and 42 in the transmission sections 24 and 26. It should be noted, as shown in FIG. 22, the collar 624 on the valve housing may be located in the gap 25 and disposed in contact with one of the exterior surfaces, such as exterior surface 36 of the transmission section 22. In this position, the housing of the valve 600 is fixedly mounted in the bore in the transmission section 22 by friction fit or other mechanical attachment methods.

By way of example in FIGS. 22 and 23, the actuator is in the form of the shoulder 46. During engagement of the transmission sections 22 and 24, the end flanges 652 and 654 of the plunger 640 will contact the shoulder 46. Continued movement of the facing surfaces 23 and 36 of the transmission sections 24 and 22 together overcomes the biasing force of the spring 646 moving the plunger 640 to the right in the orientation of the valve 600 shown in FIGS. 20, 22 and 23. During this axial or longitudinal movement of the plunger 640, the plug 650 at the second end 608 of the body 602 will move axially out of the bore 604 separating the O-ring 653 on the plug 650 from the conical surface 618 at the second end 608 of the body 602. This opens the flow path through the opening in the second end 608 of the body 602 from the bore 26 in the transmission section 22 in the direction of the arrows in FIG. 23, through the bore 604 in the body 602, around the shaft 644, the fingers 647 and 648, and the rib 658, and into and through the bore 42 in the transmission section 24.

When the transmission sections 22 and 24 are separated or disengaged, the spring 646 in the body 602 of the valve 600 continually exerts a biasing force on the plunger 640 until the transmission sections 22 and 24 are separated by a sufficient distance so that the end flanges 652 and 654 on the plunger 640 disengages from the actuator or shoulder 46 in the bore 42 of the transmission section 24. The spring 646 can then expand, moving the plunger 640 to the left in the orientation of the body 602 of the valve 600 shown in FIGS. 20 and 22 until the O-ring 653 again sealingly engages the conical surface 618 at the second end 608 of the body 602 closing fluid flow between the bore 26 in the transmission section 22 in which valve 600 is mounted and the bore 604 in the body 602 of the valve 600.

What is claim is:

1. A valve mounted between first and second separable and joinable transmission sections that allows fluid to flow through a fluid flow path when the first and second transmission sections are joined and prevents fluid from flowing through the fluid flow path when the first and second transmission sections are separated, the valve comprising:
   a valve body separate from the first and second transmission sections and having:
      a through bore having two longitudinally spaced, continuous portions that define a shoulder, wherein the through bore provides a fluid inlet and a fluid outlet;
      one or more seals disposed on an outer surface of the valve body; and
      an external flange disposed on the outer surface of the valve body that provides an insertion limiter that limits insertion of the valve body into one of the first and second transmission sections;

an elongated plunger having:
  a bulbous plug disposed on a first end of the plunger, the plug having a seal ring fixedly coupled to and extending an entire perimeter of an outer surface of the plug, the seal ring being adapted to close the valve by contacting a tapered surface on a distal end of the through bore;
  a second end opposite the first end that projects through the fluid outlet defined by the through bore, the second end having a surface that is contacted by one of the first and second transmission sections only when the first and second transmission sections are joined; and
  a valve stem having:
    an elongated shaft disposed on a proximal end of the valve stem, the elongated shaft being adapted to transition into two fingers, the two fingers being separated by a channel and having exterior surfaces which slidingly contact a larger diameter interior portion of the through bore and having a combined cross-section geometry that does not fill the bore and allows fluid to flow around the valve stem and through the channel; and
    a tapered portion disposed on a distal end of the valve stem, the tapered portion being adapted to make contact with and fit within the fluid outlet defined by the through bore, such that, the tapered portion limits movement of the plunger in the direction of the fluid inlet and provides a contact surface which is engaged by a shoulder of one of the first and second transmission sections when the first and second transmission sections are joined, wherein the plunger is forced toward the fluid outlet when the shoulder of the one of the first and second transmission sections makes contact with the tapered portion and wherein fluid is allowed to flow through the valve body when the plunger is forced toward the fluid outlet; and
  a bias spring disposed in the through bore and having a first end seated on the shoulder defined by the two longitudinally spaced, continuous portions of the through bore and a second end opposite the first end seated on a portion of the elongated shaft of the valve stem, the bias spring being adapted to bias the plunger toward a position in which the plug seals an open end of the valve body disposed at the fluid inlet defined by the through bore.

2. The valve of claim 1, wherein:
the elongated plunger includes a unitary, one piece plunger.

3. The valve of claim 1, wherein:
the seal ring of the plug is an O-ring; and
the O-ring retains the elongated plunger in the valve body when the O-ring is engaged with the valve body.

4. A valve that controls fluid flow through a fluid path, the valve comprising:
  a valve body adapted to be mounted between first and second transmission sections, the valve body having:
    a through bore having two longitudinally spaced, continuous portions that define a shoulder, wherein the through bore provides a fluid inlet and a fluid outlet;
    one or more seals disposed on an outer surface of the valve body; and
    an insertion limiter disposed on the outer surface of the valve body that limits insertion of the valve body into one of the first and second transmission sections;
  an elongated plunger having:
    a bulbous plug disposed on a first end of the plunger, the plug having a seal ring fixedly coupled to and extending an entire perimeter of an outer surface of the plug, the seal ring being adapted to close the valve by contacting a tapered surface on a distal end of the through bore, wherein the plug is adapted to be inserted into a first end of the through bore and to be forcedly transitioned through a second end of the through bore opposite the first end of the through bore, such that, the seal ring is compressed prior to the plug exiting the second end and expanded after the plug exits the second end;
  a second end of the plunger opposite the first end of the plunger that projects through the fluid outlet defined by the through bore, the second end having a surface that is adapted to be contacted by one of the first and second transmission sections only when the valve body is mounted to the first and second transmission sections; and
  a valve stem having:
    an elongated shaft disposed on a proximal end of the valve stem, the elongated shaft being adapted to transition into two fingers, the two fingers being separated by a channel and having exterior surfaces which slidingly contact a larger diameter interior portion of the through bore and having a combined cross-section geometry that does not fill the bore and allows fluid to flow around the valve stem and through the channel; and
    a tapered portion disposed on a distal end of the valve stem, the tapered portion being adapted to make contact with and fit within the fluid outlet defined by the through bore, such that, the tapered portion limits movement of the plunger in the direction of the fluid inlet and provides a contact surface which is adapted to be engaged by a shoulder of one of the first and second transmission sections when the valve body is mounted to the first and second transmission sections, wherein the plunger is forced toward the fluid outlet when the shoulder of the one of the first and second transmission sections makes contact with the tapered portion and wherein fluid is allowed to flow through the valve body when the plunger is forced toward the fluid outlet; and
  a bias spring disposed in the through bore and having a first end seated on the shoulder defined by the two longitudinally spaced, continuous portions of the through bore and a second end opposite the first end seated on a portion of the elongated shaft of the valve stem, the bias spring being adapted to bias the plunger toward a position in which the plug seals an open end of the valve body disposed at the fluid inlet defined by the through bore.

5. The valve of claim 4, wherein:
the elongated plunger includes a unitary, one piece plunger.

6. The valve of claim 4, wherein:
the seal ring of the plug is an O-ring; and
the O-ring retains the elongated plunger in the valve body when the O-ring is engaged with the valve body.

7. The valve of claim 4, wherein:
the first and second transmission sections are selectively separable and selectively joinable.

* * * * *